(12) United States Patent
Yoshinaga et al.

(10) Patent No.: US 6,444,176 B1
(45) Date of Patent: Sep. 3, 2002

(54) APPARATUS FOR PURIFICATION OF WATER AREA

(75) Inventors: Katsutoshi Yoshinaga; Hironao Kasai, both of Nagasaki (JP)

(73) Assignee: Marine Techno Research, Inc., Nagasaki-ken (JP)

( * ) Notice: Subject to any disclaimer, the term of this patent is extended or adjusted under 35 U.S.C. 154(b) by 0 days.

(21) Appl. No.: 09/284,731

(22) PCT Filed: Aug. 20, 1998

(86) PCT No.: PCT/JP98/03679

§ 371 (c)(1),
(2), (4) Date: Apr. 19, 1999

(87) PCT Pub. No.: WO99/08967

PCT Pub. Date: Feb. 25, 1999

(30) Foreign Application Priority Data

Aug. 20, 1997 (JP) .............................................. 9-240445

(51) Int. Cl.[7] .............................. B06B 1/00; A61L 2/00
(52) U.S. Cl. ........................ 422/128; 422/20; 422/127; 422/186.07; 210/192; 210/219; 210/748
(58) Field of Search ........................ 422/20, 127, 128, 422/186.07, 192, 219; 210/748

(56) References Cited

U.S. PATENT DOCUMENTS

| | | | | |
|---|---|---|---|---|
| 2,578,505 | A | * | 12/1951 | Carlin .......................... 210/748 |
| 2,585,103 | A | * | 2/1952 | Fitzgerald .................... 210/748 |
| 2,768,135 | A | * | 10/1956 | Adelson ....................... 210/748 |
| 3,686,115 | A | * | 8/1972 | Farman et al. ............... 210/748 |
| 4,235,711 | A | * | 11/1980 | Koblanski .................... 210/748 |
| 4,267,049 | A | * | 5/1981 | Erickson et al. ............. 210/606 |
| 5,006,266 | A | * | 4/1991 | Schram ........................ 120/748 |
| 5,120,450 | A | * | 6/1992 | Stanley, Jr. .................. 210/748 |
| 5,203,989 | A | * | 4/1993 | Reidy ........................... 210/137 |
| 5,417,550 | A | * | 5/1995 | Kasai et al. .................. 417/151 |
| 5,624,573 | A | * | 4/1997 | Wiesmann .................... 210/748 |
| 5,688,405 | A | * | 11/1997 | Dickinson et al. ........... 210/748 |
| 5,688,406 | A | * | 11/1997 | Dickinson et al. ........... 210/748 |
| 5,711,887 | A | * | 1/1998 | Gastman et al. ............. 210/748 |

FOREIGN PATENT DOCUMENTS

| | | |
|---|---|---|
| CH | 656 604 | 7/1986 |
| DE | 43 23 212 | 1/1995 |
| DE | 44 07 564 | 9/1995 |

* cited by examiner

Primary Examiner—Robert J. Warden, Sr.
Assistant Examiner—Imad Soubra
(74) Attorney, Agent, or Firm—Wenderoth, Lind & Ponack, L.L.P.

(57) ABSTRACT

A regional water purifier collects blue green algae continuously by using a water flow produced by the operation of a water flow generator, and continuously and efficiently processes the algae to make it inactive by irradiating ultrasonic waves thereon. Thus, regional water purification is performed efficiently at a far lower cost than the conventional method through the blue green algae processing. The purifier includes a blue green algae processing duct 2, which is disposed under water where blue green algae breed in large quantities, and has an ultrasonic wave transmitter 3 therein for transmitting ultrasonic waves to process the blue green algae with the ultrasonic waves. Both ends of the duct 2 are open, and a water flow generator 4 produces a suction flow for sucking water containing blue green algae into the blue green algae. processing duct 2 from a first end 2a and a discharge flow for discharging the water from the second end 2b.

28 Claims, 15 Drawing Sheets

APPARATUS FOR PURIFICATION OF WATER AREA

BACKGROUND OF THE INVENTION

1. Field of the Invention

The present invention relates to a regional water purifier in which phytoplankton, especially blue green algae, breeding in large quantities in an enclosed water is collected by using a water flow generated by the operation of a water flow generator, and is processed to be made inactive by irradiating an ultrasonic wave, by which the regional waters are purified through blue green algae processing.

2. Description of the Prior Art

As a result of the propagation of phytoplankton, especially blue green algae, breeding in large quantities in eutrophicated water, the water surface is covered with a green substance. As a result, there are many in Japan and foreign countries where the green substance poses a problem in terms of environmental protection of water and visual access.

To solve this problem, many anti-blue green algal measures have been attempted. These measures are classified broadly as follows:

(1) Collective removal
  1) Mechanical collection, removal
  2) Air bubble pluming, removal
(2) Degradation, sedimentation
  1) Degradation using biological drug
  2) Sedimentation using biological drug
(3) Algae processing/cell destruction
  1) Mechanical method
    a) High pressure
    b) Impact pressure
    c) Others
  2) Chemical method
    a) Anti-algal additives
(4) Propagation control
  (Control of water temperature, pH, nitrogen, phosphorus, composition ratio change, etc.)

Although all of the aforementioned measures of (1) to (4) have been attempted, only (3)-2)-a) addition of copper sulfate solution achieved a relatively distinct effect. Other, measures scarcely have any effect in relation to great effort, and if they have, the effect is very little, and their cost: effectiveness is very low. At present, there are no effective antiblue green algal measures.

For example, a notable anti-blue green algal measure is the collection and removal (corresponding to the above item of (1)-1)) using a surface layer algae collector vessel, which has been used practically in Lake Kasumiga-Ura and other places. With this method, an expensive algae collector vessel must always be provided, and endless collection work must be continued to collect infinitely propagating blue green algae in unmeasured numbers. Further, it takes much time and cost to remove, after filtering and dehydration, large quantities of collected blue green algae. Therefore, this method is not practical, and not modernistic as a technology in the modern technical society.

Also, the above item (2) has a problem in that this method is effective in one type of blue green algae but ineffective in another type blue green algae. Thus, it is generally difficult to say that this method has a remarkable effect.

Further, the above item (3)-2) sometimes has a significant effect. However, this method is hated or prohibited as the present measures in reservoirs, lakes, and rivers because a chemical substance is injected in the system.

SUMMARY OF THE INVENTION

The present invention has been made in view of the above situation to solve the above problems. Accordingly, an object of the present invention is to provide a regional water purifier in which blue green algae are collected continuously by using a water flow produced by the operation of a water flow generator, and continuously and efficiently processed to be made inactive by irradiating ultrasonic waves thereon. Thus, which regional water purification is performed efficiently at a far lower cost than the conventional method through the blue green algae processing.

To achieve the above object, the invention provides a regional water purifier comprising a blue green algae processing duct, which is disposed under water in regional waters where blue green algae breed in large quantities. The processing unit has an ultrasonic wave transmitter therein for transmitting ultrasonic waves to process the blue green algae with the ultrasonic waves so as to make them inactive, and both ends of the processing duct are open. The purifier also comprises a water flow generator, which produces a suction flow for sucking water containing blue green algae into the blue green algae processing duct from one end, and a discharge flow for discharging the water from the other end.

Here, an ultrasonic wave reflector may be mounted on the inner peripheral surface of the blue green algae processing duct, and the ultrasonic wave reflector may be formed by a n irregular reflector.

The ultrasonic wave transmitter may be disposed in a ring shape at the inside center of the blue green algae processing duct so that the ultrasonic waves are transmitted radially from the inside center toward the inner peripheral surface, or the ultrasonic wave transmitter may be disposed obliquely on the inner peripheral surface at the other end of the blue green algae processing duct toward one end thereof. Further, the ultrasonic wave transmitter may be disposed at the other end of the blue green algae processing duct toward one end thereof.

The water flow generator may be disposed at the other end of the blue green algae processing duct, or the water flow generator may be incorporated in a rectifier duct consisting of a duct having both ends open to enhance the water flow generating capability of the water flow generator. Further, the water flow generators may be disposed in plural numbers at appropriate intervals in the duct axis direction at the inside center of the blue green algae processing duct, and the ultrasonic wave transmitters may be disposed in plural numbers at appropriate intervals in the duct axis direction of the blue green algae processing duct.

The blue green algae processing duct may be curved so that one end of the suction inflow side is placed horizontally in the vicinity of the water surface, and the other end of the discharge side is placed horizontally at a position deeper than one end. Alternatively, the blue green algae processing duct may be curved so that one end of the suction inflow side is placed horizontally in the vicinity of the water surface, and the other end of the discharge side is placed horizontally on the water bottom side. Further, one end at the suction inflow side of the blue green algae processing duct may be expanded in a trumpet shape.

Ozone may be mixed with the discharge flow. Also, the water flow generator may be provided with an ozone gas aerating part.

The invention also provides a regional water purifier in which an ultrasonic wave transmitter for transmitting ultrasonic waves to process blue green algae with the ultrasonic waves so as to make them inactive and an ultrasonic wave reflector are disposed opposite to each other in a water channel of regional waters where blue green algae breed in large quantities. A water flow generator is provided to produce a discharge flow for discharging the water containing blue green algae toward the regional waters where the ultrasonic wave transmitter and the ultrasonic wave reflector are disposed.

Here, the ultrasonic wave transmitter may be disposed on one side surface of the water channel, and the ultrasonic wave reflector may be disposed on the other side surface of the water channel. Alternatively, the ultrasonic wave transmitters may be disposed in plural numbers toward both side surfaces of the water channel at the center of the water channel of regional waters where blue green algae breed in large quantities, and the ultrasonic wave reflectors may also be disposed in plural numbers on both side surfaces of the water channel of regional waters where blue green algae breed in large quantities.

The ultrasonic wave reflector may be by an irregular reflector.

The water flow generator may be incorporated in a flow regulating duct consisting of a duct having both ends open to enhance the water flow generating capability of the water flow generator.

Ozone may be mixed with the discharge flow. Also, the water flow generator may be provided with an ozone gas aerating part.

DESCRIPTION OF THE PREFERRED EMBODIMENTS

Figure 1:
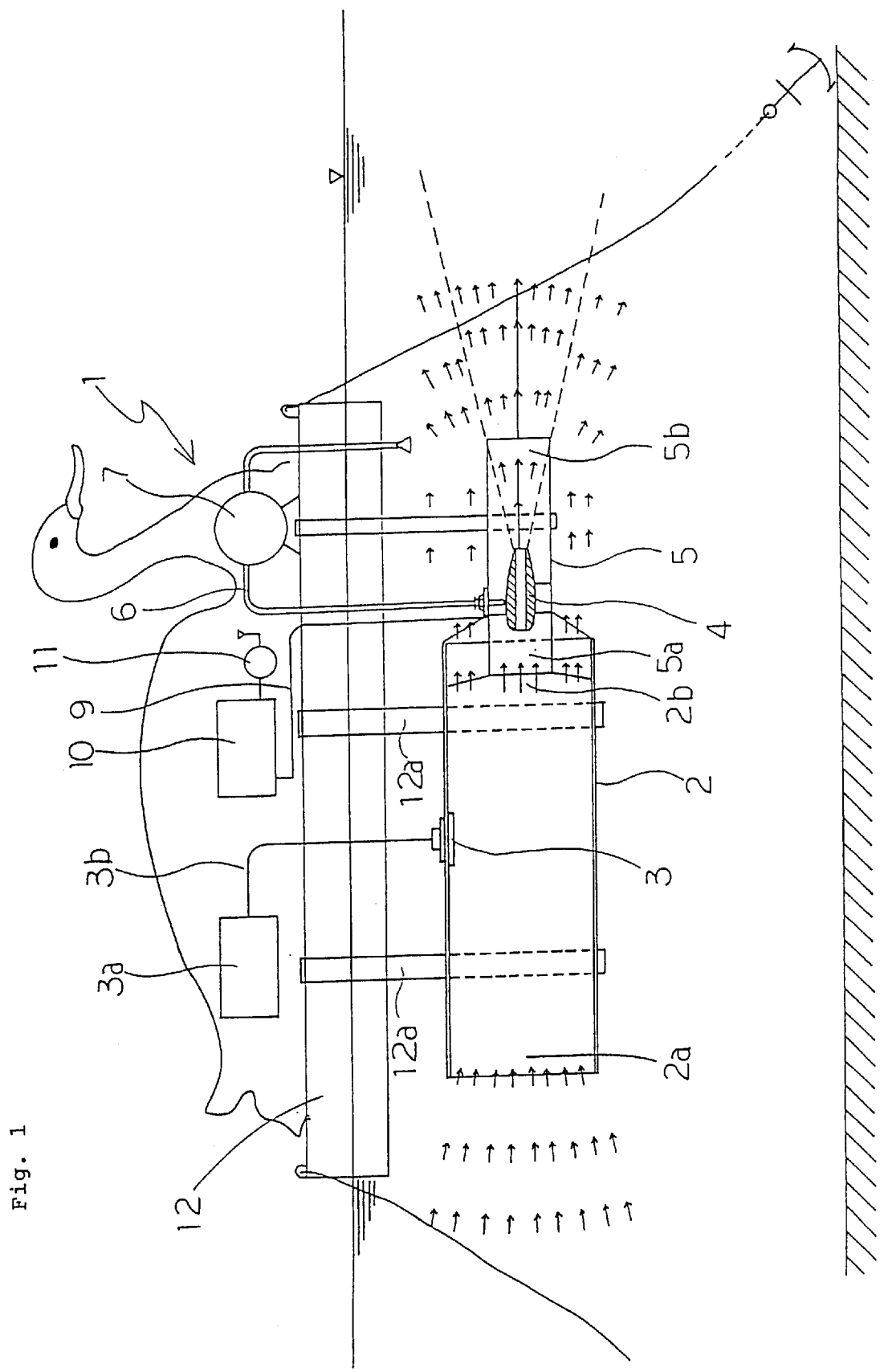
FIG. 1 is a schematic side view of a regional water purifier showing Embodiment 1 of the present invention.

The present invention will be described in detail with reference to embodiments shown in the accompanying drawings.

Embodiment 1

In FIGS. 1 to 13 show Embodiment 1 of the present invention, a regional water purifier 1, which purifies enclosed water through blue green algae processing. The water purifier consists mainly of a blue green algae processing duct 2 which incorporates an ultrasonic wave transmitter 3 generating ultrasonic waves into water in the regional waters where blue green algae breed in large quantities to process the blue green algae with the ultrasonic waves so as to make them inactive. Both ends of the processing duct are open, and a water flow generator 4 generates a suction flow for sucking water containing blue green algae into the blue green algae processing duct 2 from its first end 2a (inlet end) and a discharge flow for discharging the water from the second end 2b (outlet end).

The regional water purifier 1 is used by being hung from a later-described floating body 12 and held under the water surface, or by being placed on the bottom of the water. In the case where the regional water purifier 1 is held under the water surface, the blue green algae processing duct 2 and a flow regulating duct 5 incorporating the water flow generator 4 are held by hanging members 12a of the later-described floating body 12 which floats on the water surface, and are located under the water surface below the floating body 12. The water flow generator 4 is generally incorporated in the flow regulating duct 5.

The blue green algae processing duct 2 has, for example, a hollow cylindrical shape, and both ends thereof are open. It is placed under water in the regional waters where blue green algae breed in large quantities. With the blue green algae processing duct 2, water containing blue green algae flows into the first end 2a of the duct by the suction flow produced by the water flow generator 4, and the blue green algae floating under water are processed to be made inactive by ultrasonic waves generated by the ultrasonic wave transmitter 3 incorporated in the duct. After processing, the blue green algae are discharged together with water through the second end 2b.

Usually, the blue green algae processing duct 2 is placed in regional waters where blue green algae breed in large quantities so that the duct axis direction thereof is horizontal. However, it is sometimes arranged in a curved state as shown in FIGS. 2 to 5.

Figure 2:
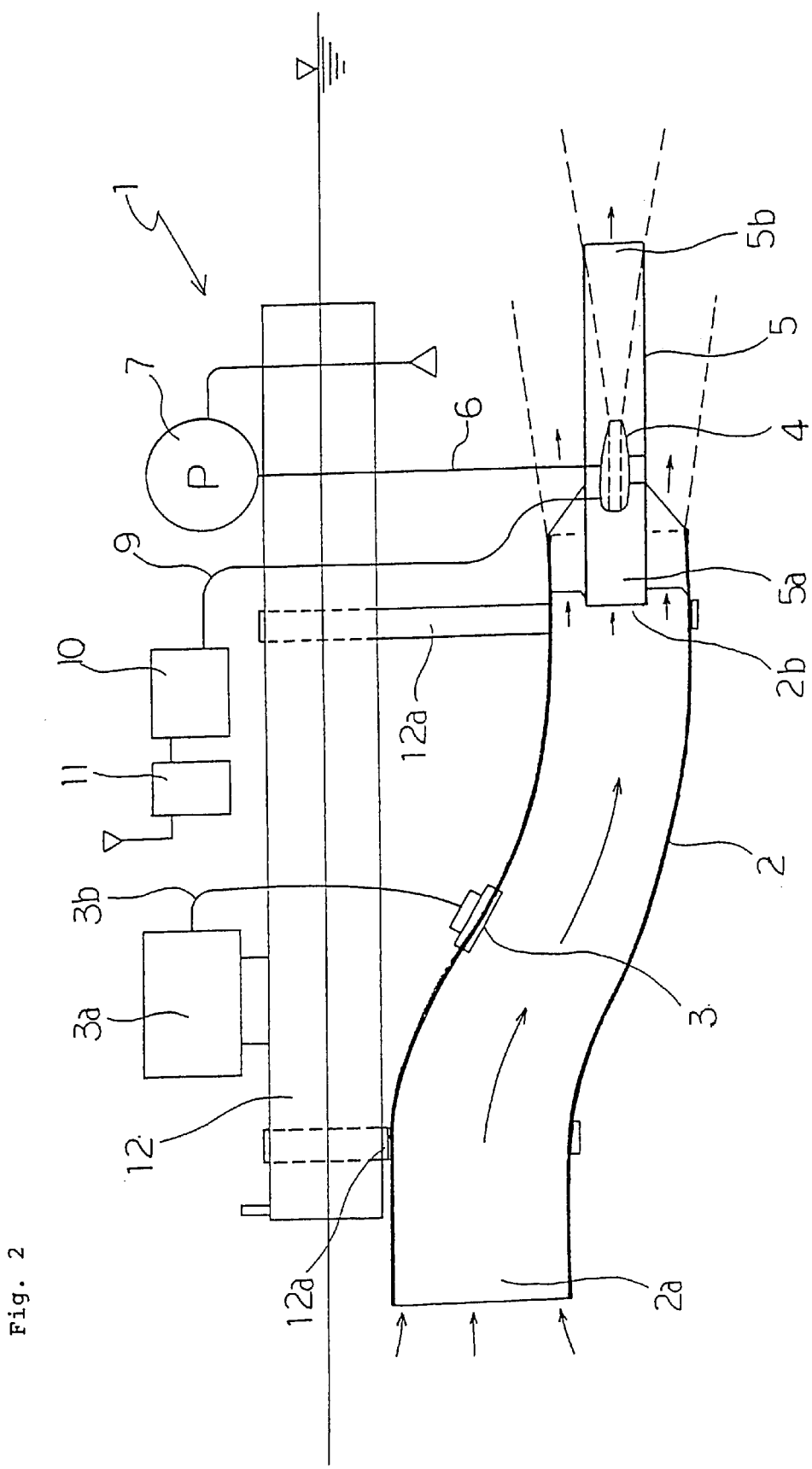
FIG. 2 is another schematic side sectional view of a regional water purifier showing Embodiment 1 of the present invention.
Figure 3:
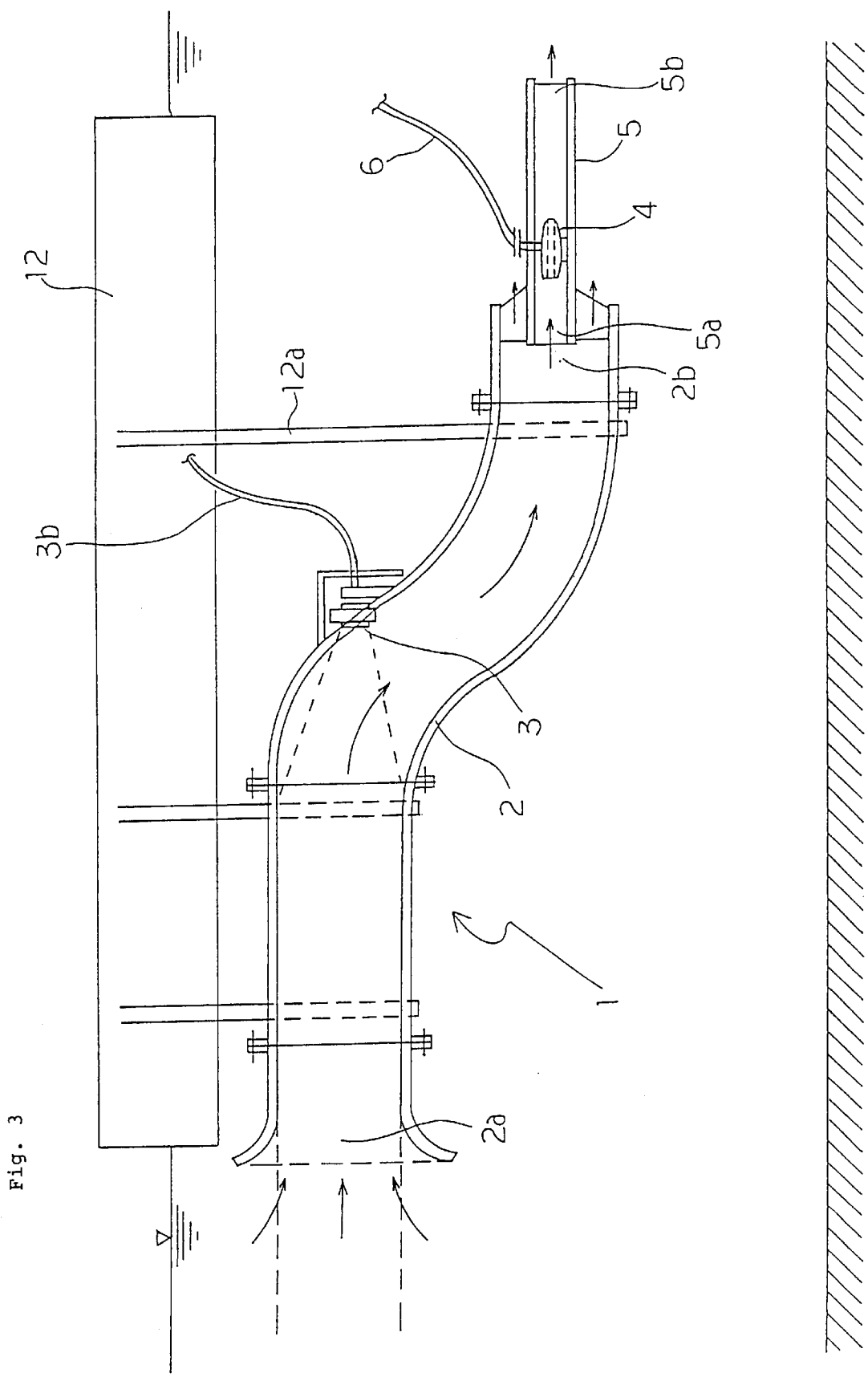
FIG. 3 is another schematic side sectional view of a regional water purifier showing Embodiment 1 of the present, invention.

For example, as shown in FIGS. 2 and 3, the blue green algae processing duct 2 is formed so that the halfway portion thereof is bent obliquely in such a manner that the first end 2a at the suction inflow side (inlet end) is disposed horizontally in the vicinity of the water surface and the second end 2b (outlet end) on the discharge side is disposed horizontally at a position deeper than the first side 2a.

Figure 4:
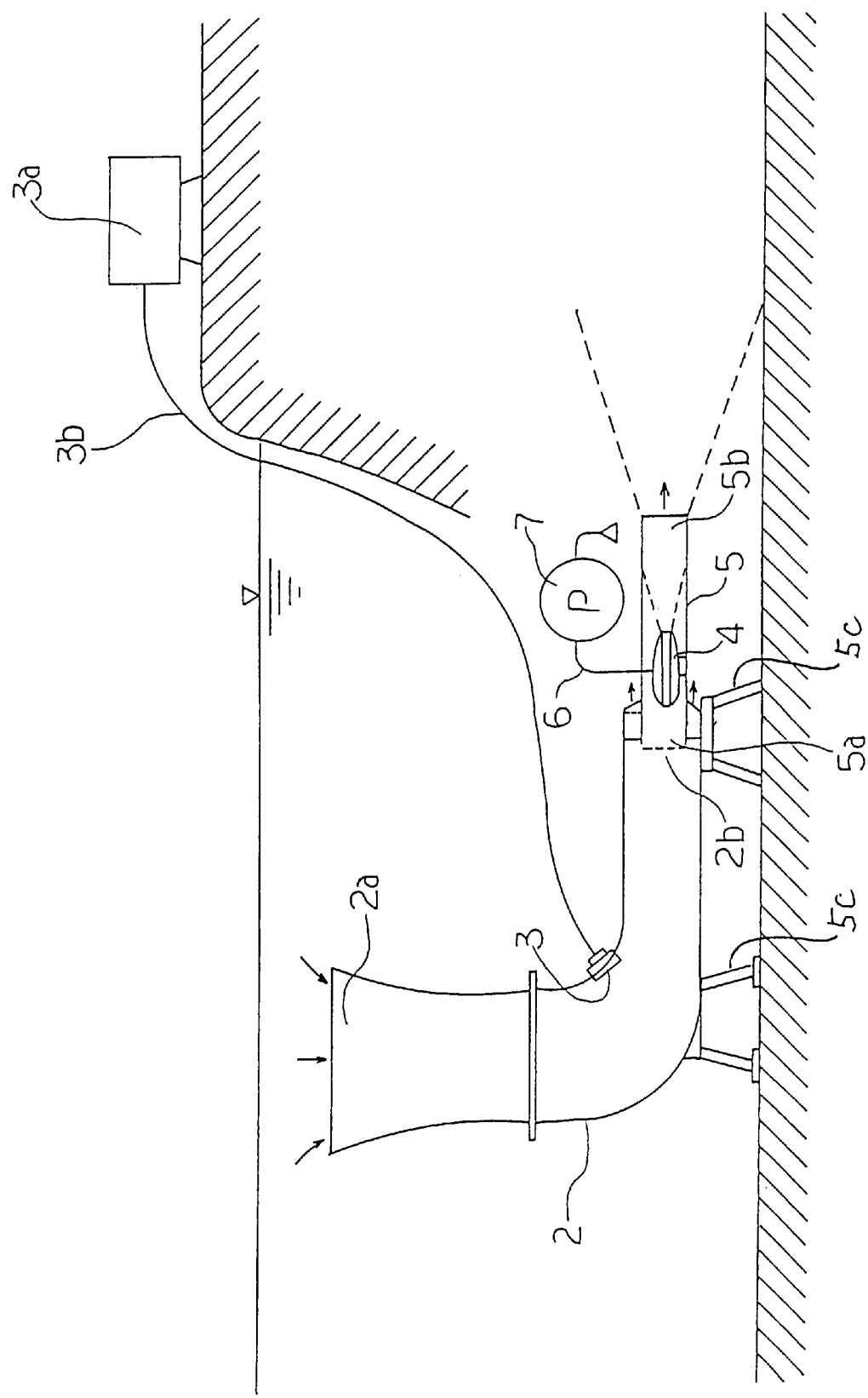
FIG. 4 is another schematic side view of a regional water purifier showing Embodiment 1 of the present invention.
Figure 5:
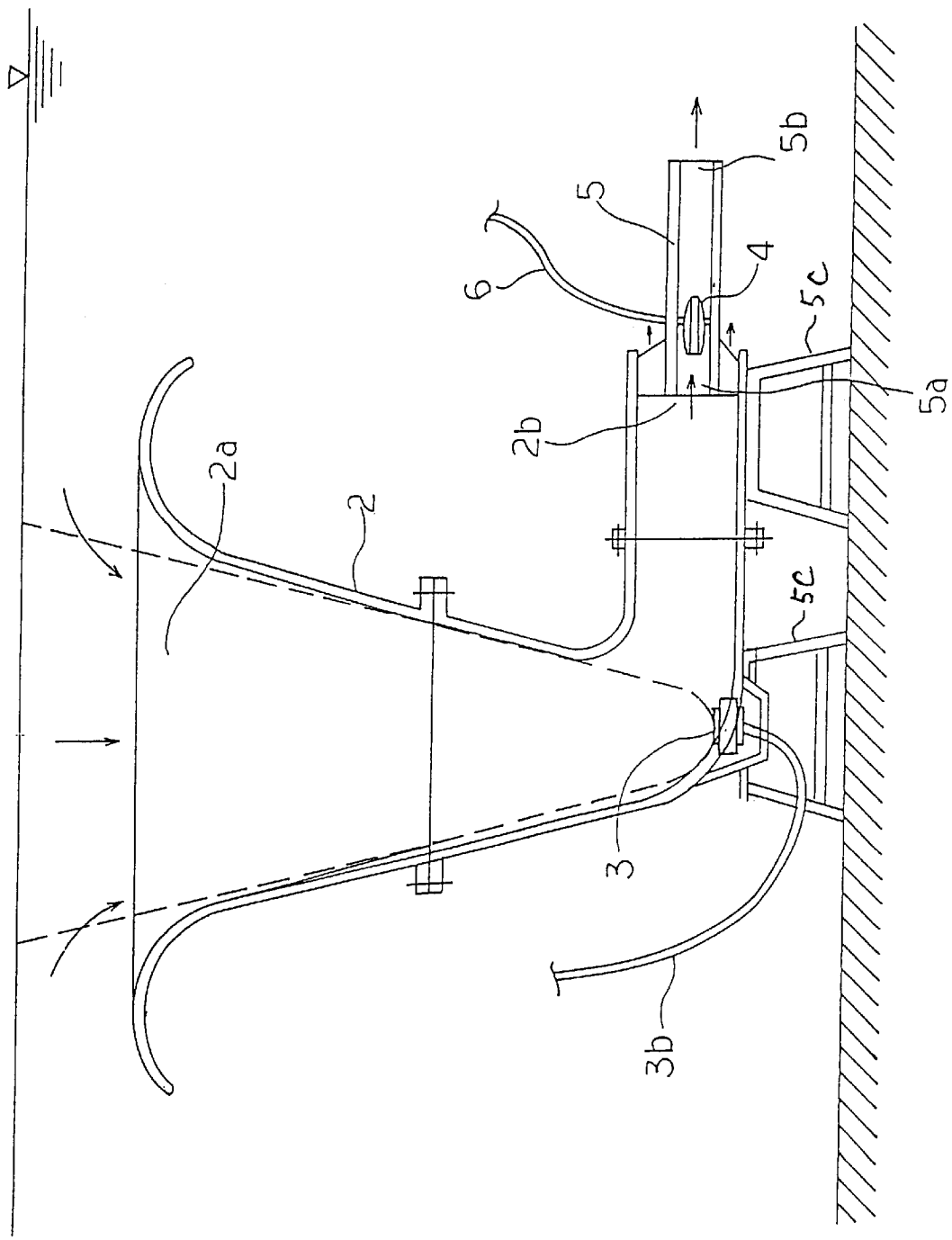
FIG. 5 is another schematic side sectional view of a regional water purifier showing Embodiment 1 of the present invention.

Also, for example, as shown in FIGS. 4 and 5, the blue green algae processing duct 2 is sometimes formed so that the halfway portion thereof is bent at right angles in such a manner that the first end 2a on the suction inflow side is arranged in an upward (vertical) direction in the vicinity of the water surface and the second end 2b on the discharge side is disposed horizontally on the water bottom side.

Figure 6:
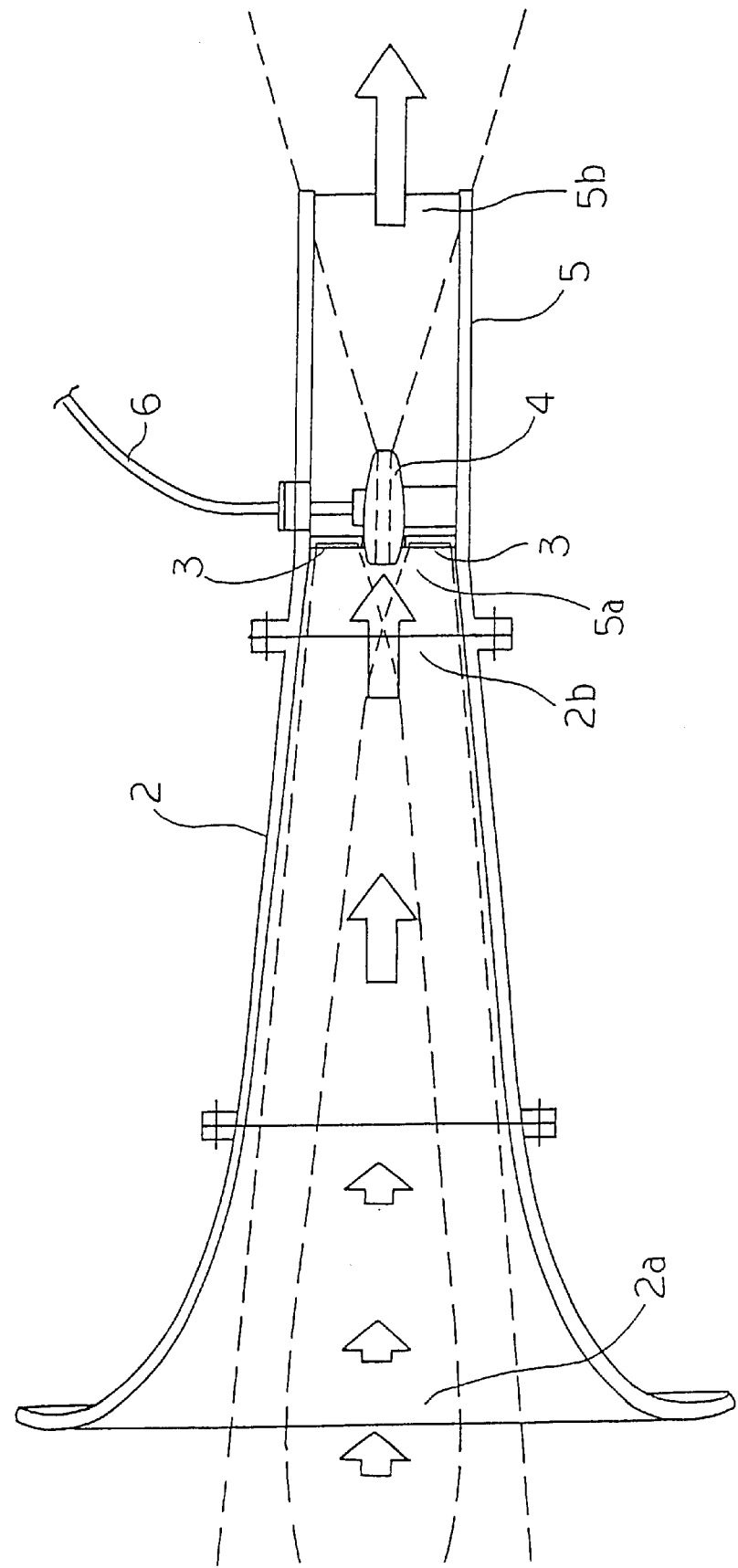
FIG. 6 is a side sectional view of a blue green algae processing duct and a rectifier duct showing Embodiment 1 of the present invention.

Further, for example, as shown in FIGS. 5 and 6, the blue green algae processing duct 2 is sometimes formed so that the first end 2a on the suction inflow side is expanded in a trumpet shape. Also, for example, as shown in FIGS. 3 and 4, only the opening periphery of the first end 2a on the suction inflow side of the blue green algae processing duct 2 is expanded in a trumpet shape. Alternatively, as shown in FIG. 6, the blue green algae processing duct 2 is formed in a trumpet shape so that the cross-sectional area thereof increases gradually from the second end 2b toward the first end 2a.

Figure 7:
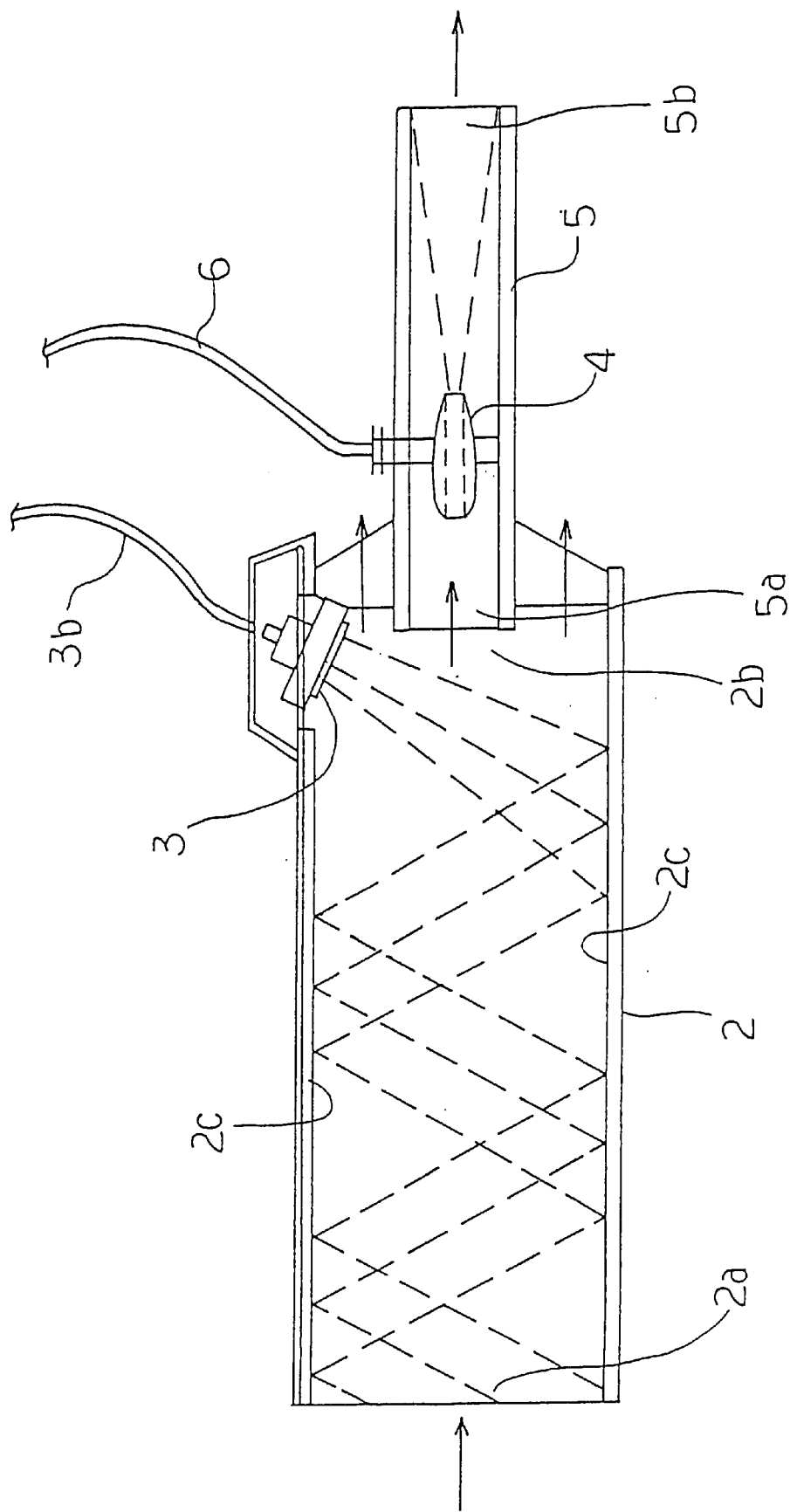
FIG. 7 is a side sectional view of a blue green algae processing duct and a rectifier duct showing Embodiment 1 of the present invention.
Figure 8:
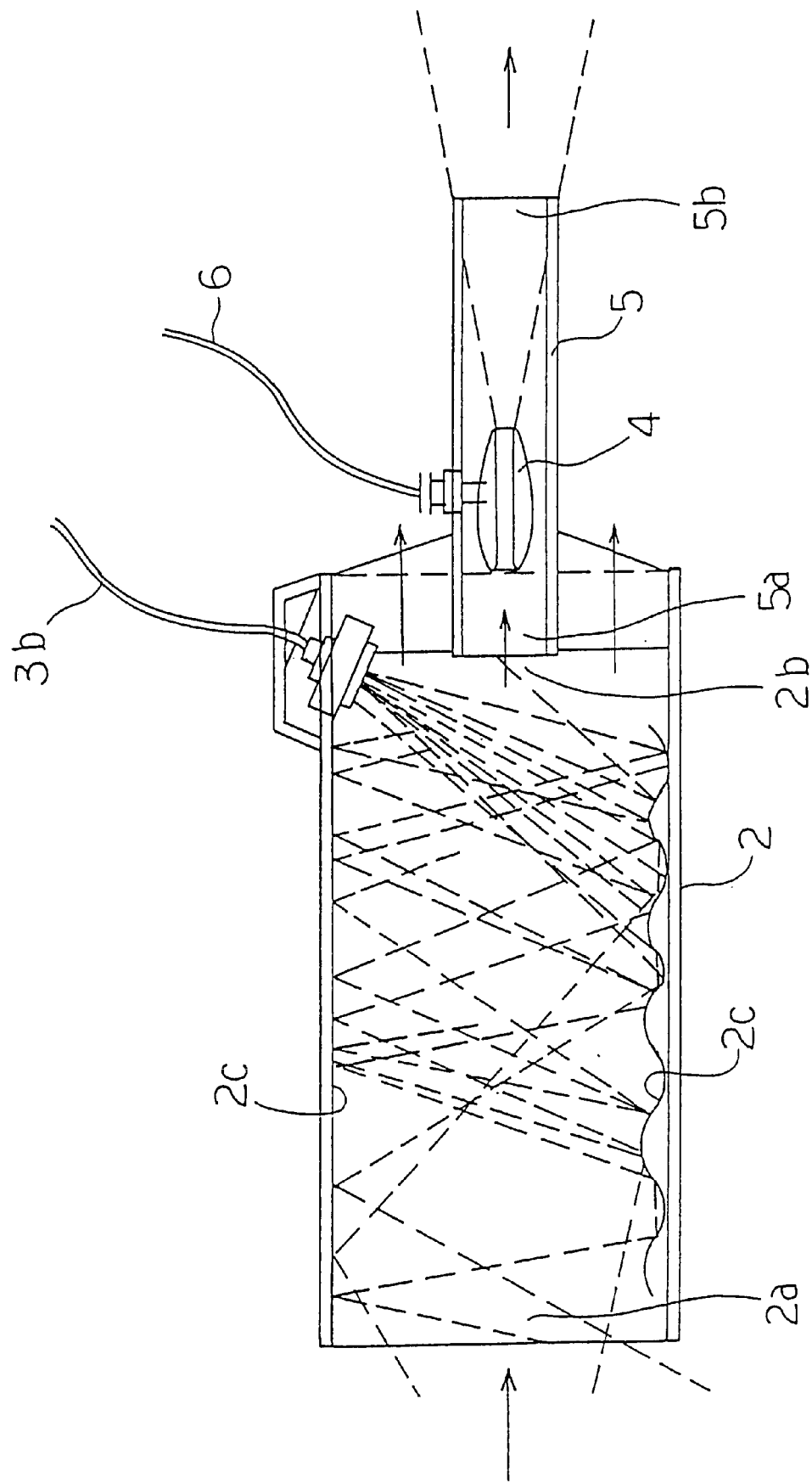
FIG. 8 is a side sectional view of a blue green algae processing duct and a rectifier duct showing Embodiment 1 of the present invention.
Figure 9:
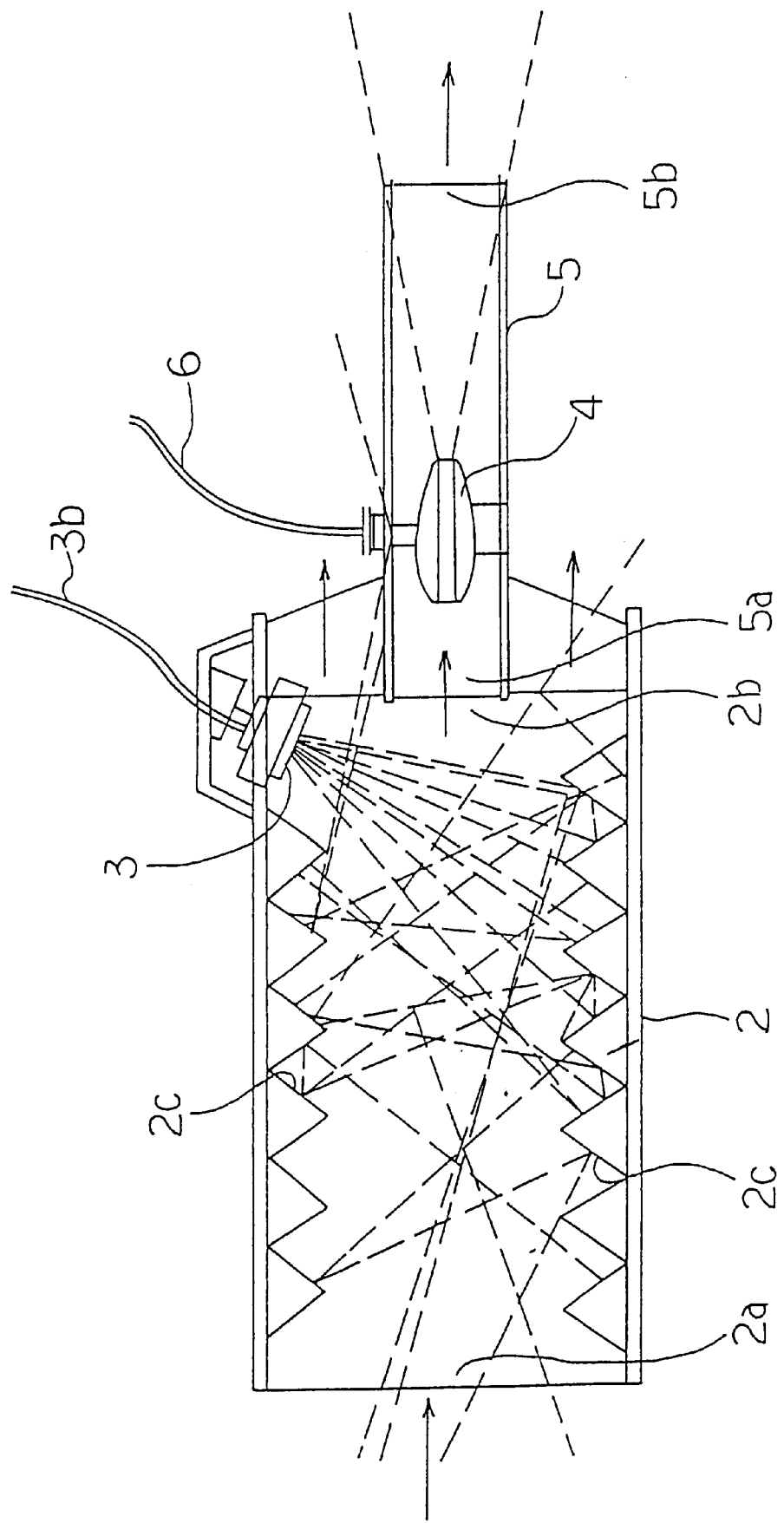
FIG. 9 is a side sectional view of a blue green algae processing duct and a rectifier duct showing Embodiment 1 of the present invention.

On the inner peripheral surface of the blue green algae processing duct 2 ,for example, as shown in FIGS. 7 to 9, an ultrasonic wave reflector 2c is usually mounted to reflect the ultrasonic waves transmitted from the ultrasonic wave transmitter 3. A metal plate is used as the ultrasonic wave reflector 2c. The ultrasonic waves transmitted from the ultrasonic wave transmitter 3 are reflected repeatedly by the ultrasonic wave reflector 2c, by which the ultrasonic waves stay in the blue green algae processing duct 2 for a long period of time, so that the floating blue green algae are easily processed to be made inactive.

The ultrasonic wave reflector 2c is configured so that the reflecting surface is formed into a flat surface as shown in FIG. 7, or so that the reflecting surface is formed into an irregularly reflecting surface which irregularly reflects the ultrasonic waves as shown in FIGS. 8 and 9. When the irregularly reflecting surface is formed, for example, as shown in FIG. 9, an irregular bent line surface is formed. The ultrasonic wave reflector 2c is also sometimes omitted as necessary.

The ultrasonic wave reflector 2c is configured so that the reflecting surface is formed into a flat surface as shown in FIG. 7, or so that the reflecting surface is formed into an irregularly reflecting surface (i.e., non-planar) which irregularly reflects the ultrasonic waves as shown in FIGS. 8 and 9. Specifically, the reflecting surface may be formed as a wavy surface as shown in FIG. 8, or as a surface having a series of triangular ridges as shown in FIG. 9. When the irregularly reflecting surface is formed, for example, as shown in FIG. 9, an irregular bent line surface is formed. The ultrasonic wave reflector 2c is also sometimes omitted as necessary.

The ultrasonic wave transmitter transmits ultrasonic waves to perform a function of processing to make inactive, by the impact of ultrasonic waves, the blue green algae contained in water flowing through the blue green algae processing duct 2. Specifically, it irradiates ultrasonic waves on the blue green algae and gives impact to them. Thereby, gas vacuoles in the blue green algae, which perform a buoyancy function, are destroyed, so that the blue green algae settle without refloating, and thereby they are placed in an inactive state which is similar to a perishing state. Therefore, the blue green algae can be processed.

The ultrasonic wave transmitter 3 is connected to an ultrasonic wave generator 3a, an electrical energy supply source, installed on the floating body 12 or on land via a wire 3b. Ultrasonic waves are transmitted by being vibrated by the electrical energy amplified by the ultrasonic wave generator 3a , whereby the blue green algae are processed.

Figure 12:
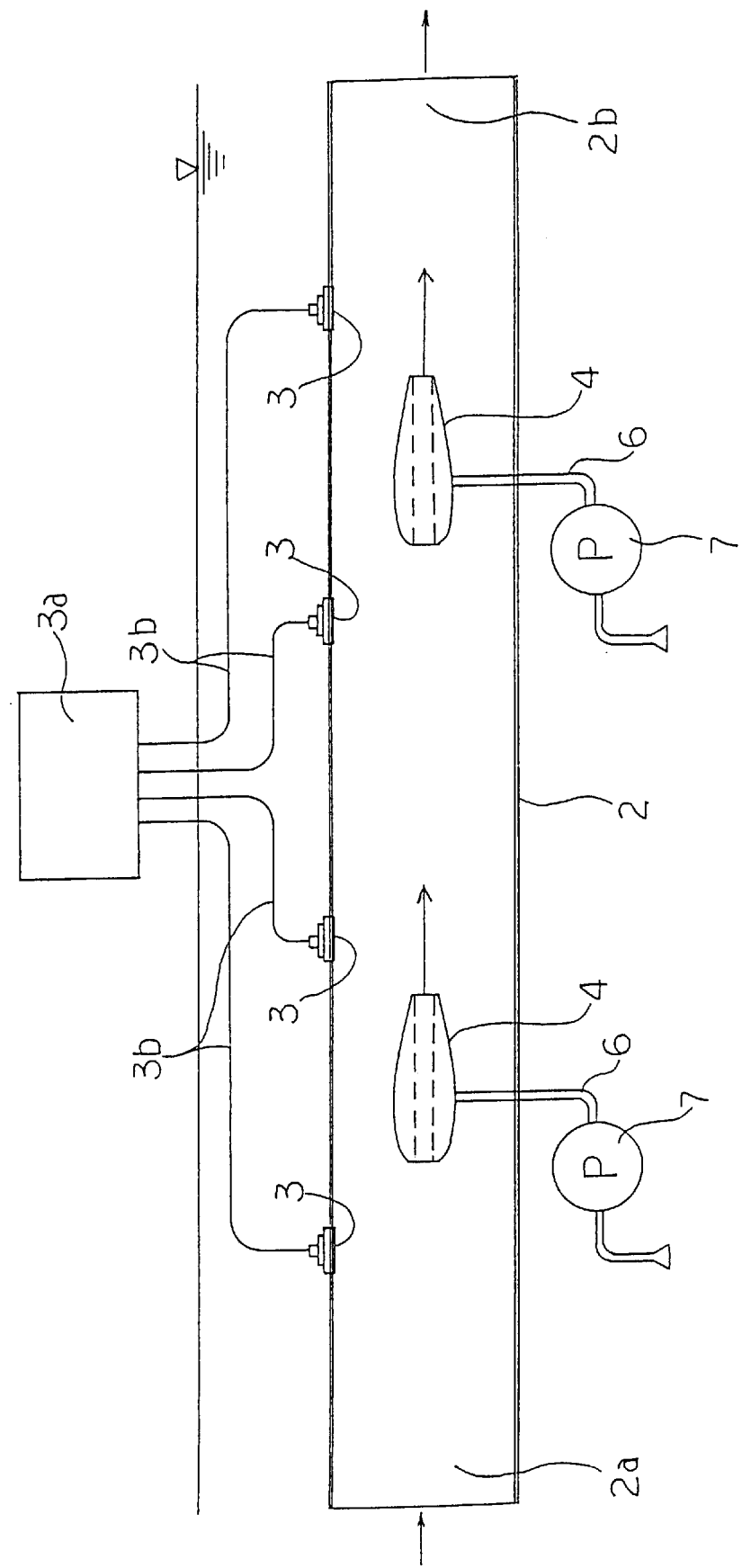
FIG. 12 is a side sectional view of a blue green algae processing duct showing Embodiment 1 of the present invention.

The ultrasonic wave transmitter 3 mounted in the blue green algae processing duct 2 is installed so as to efficiently irradiate ultrasonic waves on the blue green algae contained in water flowing the blue green algae processing duct 2. For example, as shown in FIGS. 1 and 12, the ultrasonic wave transmitter 3 is installed on the inner peripheral surface at the upper part of the blue green algae processing duct 2 in a single number or in plural numbers at appropriate intervals to transmit ultrasonic waves in the duct 2.

Figure 10A:
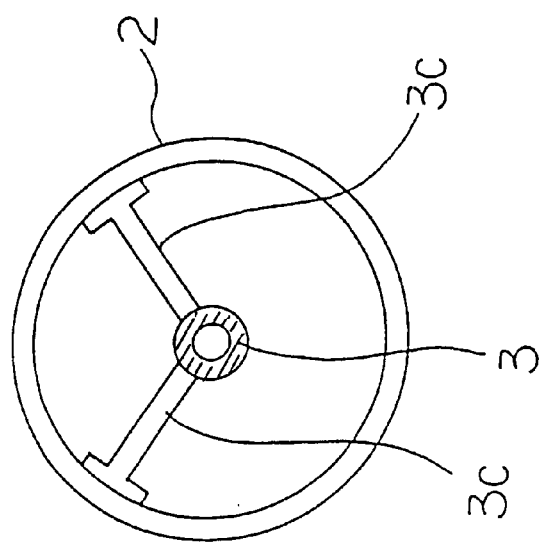
FIG. 10(A) is a front view of a blue green algae processing duct showing Embodiment 1 of the present invention.
Figure 10B:
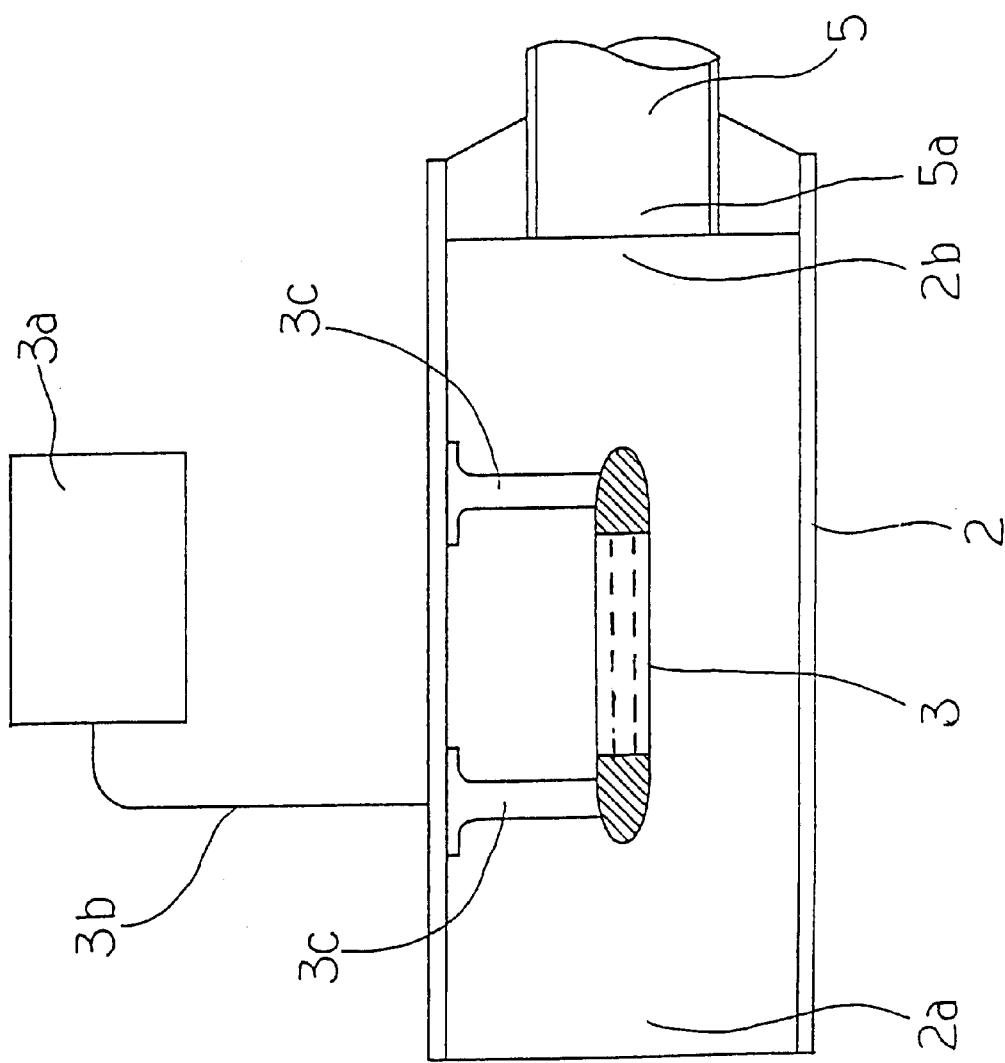
FIG. 10(B) is a side sectional view of a blue green algae processing duct showing Embodiment 1 of the present invention.

Also, for example, as shown in FIG. 10, the ultrasonic wave transmitter 3 is installed by being supported by support members 3c at the duct center of the blue green algae processing duct 2 ,and is configured to transmit ultrasonic waves radially from the central portion toward the inner peripheral surface.

Also, for example, as shown in FIGS. 7 to 9, the ultrasonic wave transmitter 3 is sometimes installed on the inner peripheral surface at the second end 2b of the blue green algae processing duct 2 so as to be obliquely angled toward the first end 2a, that is, the inlet end, and is configured so as to transmit ultrasonic waves angled obliquely toward the first end 2a of the blue green algae processing duct 2. In this case, the obliquely transmitted ultrasonic waves advance toward the first end 2a of the blue green algae processing duct 2 while being repeatedly reflected many times by the inner peripheral surface of the blue green algae processing duct 2.

Figure 11:
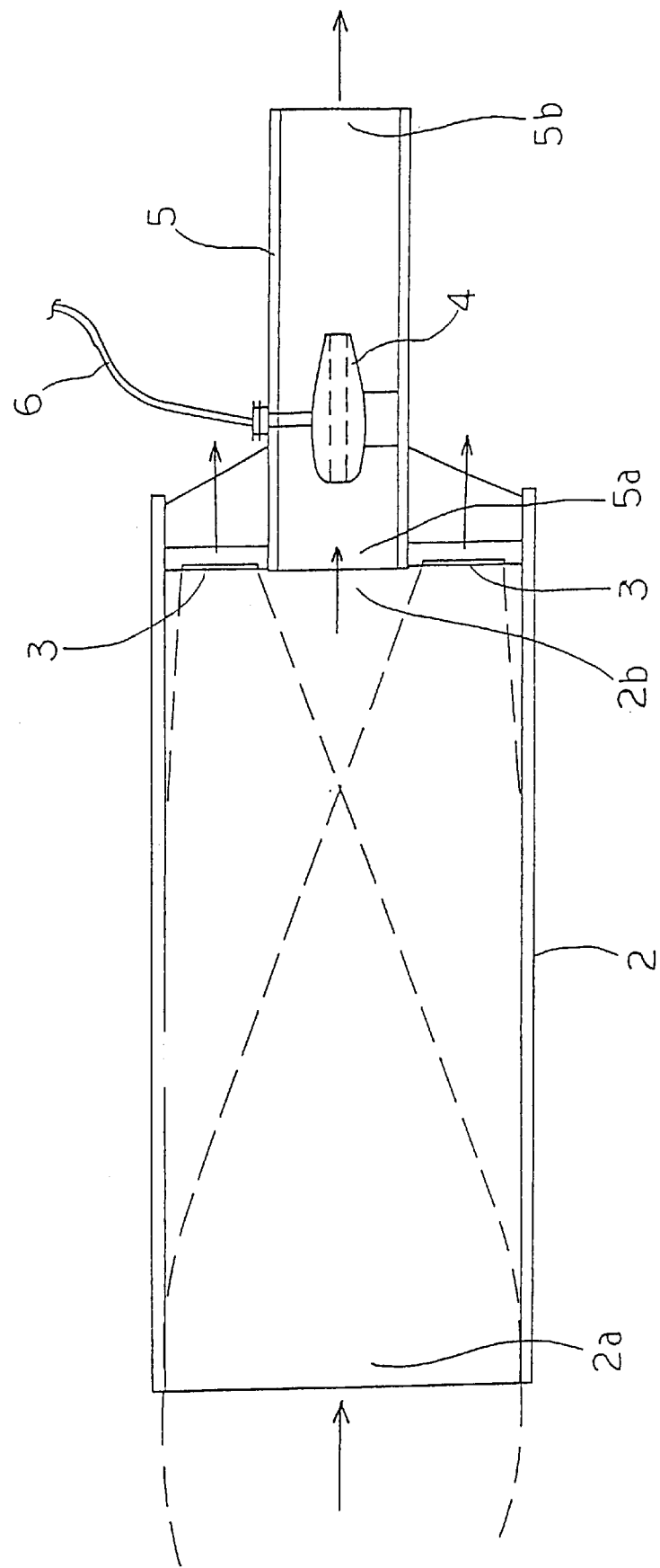
FIG. 11 is a side sectional view of a blue green algae processing duct and a rectifier duct showing Embodiment 1 of the present invention.

For example, as shown in FIG. 11; the ultrasonic wave transmitter 3 is sometimes installed at the second end 2b of the blue green algae processing duct 2 s that it faces toward the first end 2a, that is, the inlet end, and is configured so as to transmit ultrasonic waves toward the first end 2a of the blue green algae processing duct 2. In this case, the ultrasonic wave transmitter 3 is installed at a part of the second end 2b, which is open, so as not to obstruct the discharge flow to the utmost. When a rectifier duct 5 is installed at the second end 2b of the blue green algae processing duct 2, one or several ultrasonic wave transmitters 3 are installed at certain intervals at the open portion at the outer periphery of the flow regulating duct 5.

The water flow generator 4 produces a suction flow for sucking water containing blue green algae into the blue green algae processing duct 2 through the first end 2a thereof and a discharge flow for discharging the water from the second end 2b of the blue green algae processing duct 2. Usually, the flow generator is incorporated in a flow regulating duct 5 having a function of increasing the function of the water flow generator 4. However, for example, as shown in FIG. 12, the water flow generator 4 is sometimes incorporated independently in the blue green algae processing duct 2.

When the water flow generator 4 is incorporated in the flow regulating duct 5, it is installed at the second end 2b of the blue green algae processing duct 2 so that the axis thereof coincides with the duct axis of the flow regulating duct 5 incorporating the water flow generator 4. The injection direction of water injected from the water flow generator 4 is the same as the duct axis direction of the flow regulating 5, so that the water flowing from one open end of the flow regulating duct 5 is injected and discharged from the second end on the opposite side.

Figure 13:
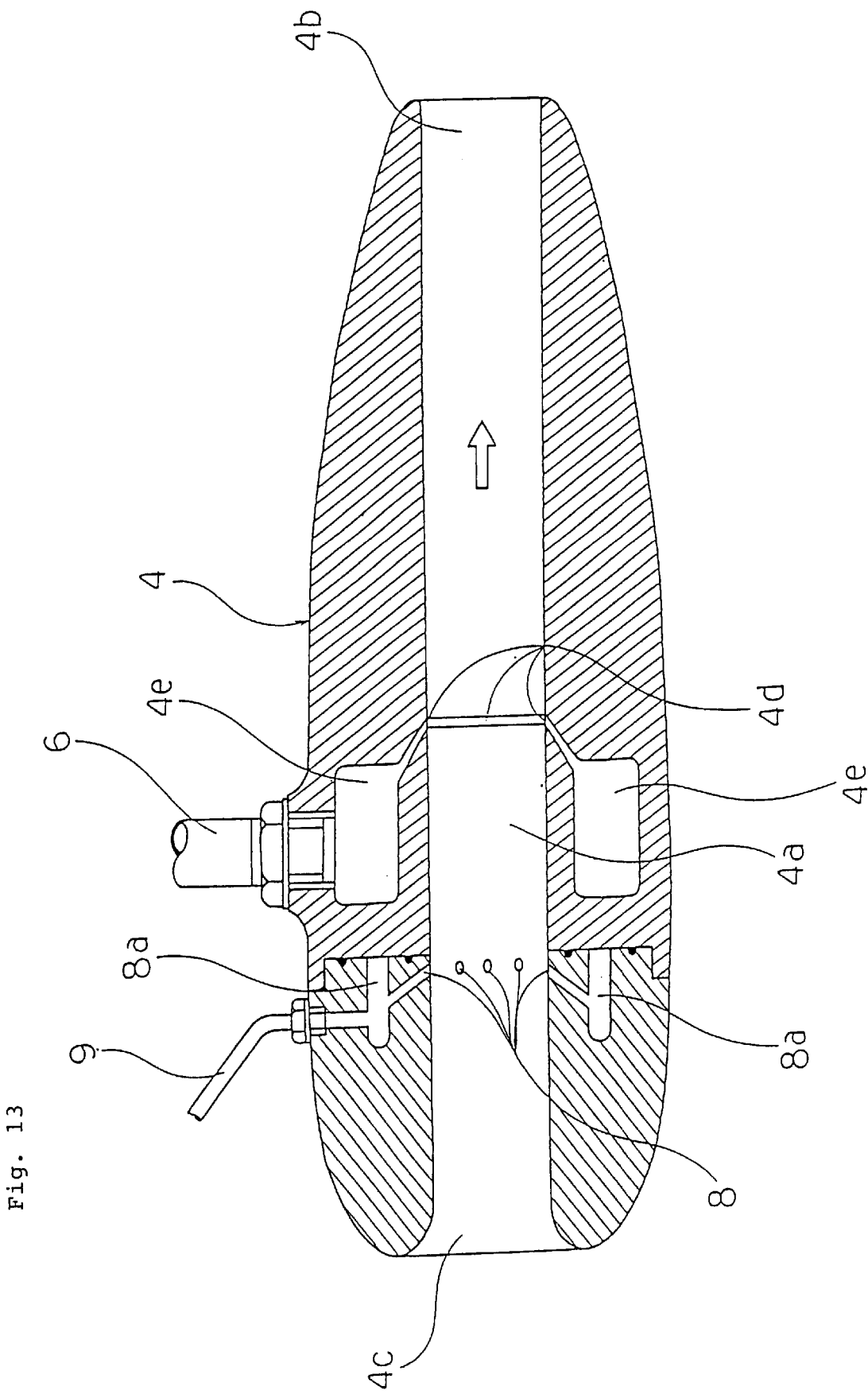
FIG. 13 is a side sectional view of a water flow generator showing Embodiment 1 of the present invention.

For example, as shown in FIG. 13, an inside portion 4a, which is a flow path having both ends open, is formed in the water flow generator 4. The inside portion 4a is formed in the lengthwise direction, that is, the axial direction of the water flow generator 4. The inside portion 4a has a cylindrical, shape. The downstream end of the cylindrical inside portion 4a consists of a water flow generator discharge port 4b, and the upstream end thereof consists of a water flow generator inflow port 4c.

On the flow path inside wall surface at an intermediate part of the inside portion 4a, an injection port 4d for injecting water is arranged in the inner peripheral direction. The injection port 4d is formed around the inner periphery of the inside portion 4a. The injection port thus formed is arranged obliquely toward the water flow generator discharge port 4b at the downstream end of the inside portion 4a.

The water injected from the injection port 4d formed obliquely toward the water flow generator discharge port 4b is injected at a high velocity toward the water flow generator discharge port 4b at the downstream end of the inside portion 4a. This high-velocity injection flow allows a negative pressure region to appear on the upstream side of the injection port 4d, and performs a function of sucking and discharging the later-described ozone.

In the section of the water flow generator 4 on the outside of the inside portion 4a, an annular drive water chamber 4e is formed so as to communicate with the injection port 4d. The drive water chamber 4e is a supply water injected through the injection port 4d, and the injection port 4d is formed on the downstream side of the drive water chamber 4e so that the water chamber 4e and injection port 4d communicate with each other.

The flow regulating duct 5, which further enhances the function of the water flow generator 4 incorporated therein, is provided with the water flow generator 4 therein. The flow regulating duct 5 incorporating the water flow generator 4 is installed at the other end 2b of the blue green algae processing duct 2, which is open.

The diameter of the opening of the flow regulating duct 5 is usually smaller than the diameter of the opening of the second (discharge) end 2b of the blue green algae processing duct 2. The flow regulating duct 5 is installed at the central portion of the second end 2b of the blue green algae processing duct 2, which is open. At the second end 2b of the blue green algae processing duct 2, to which the flow regulating duct 5 is installed, an annular opening is formed on the outer periphery of the flow regulating duct 5, so that part of water flowing in the blue green algae processing duct 2 is discharged from the annular opening.

Since part of the water flowing in the blue green algae processing duct 2 is discharged from the annular opening on the outer peripheral side of the flow regulating duct 5, the velocity of water flow induced by the water flow generator 4 is decreased effectively, and the time required for water containing blue green algae to pass through the duct is increased, so that the ultrasonic wave irradiating time on the blue green algae, which passes through the duct, is sufficiently.

For example, as shown in FIG. 6, the flow regulating duct 5 incorporating the water flow generator 4 sometimes has the same diameter as that of the second end 2b of the blue green algae processing duct 2. In this case, one end of the flow regulating duct 5 is connected to the second end of the blue green algae processing duct 2, so that all of the water discharged from the second end of the blue green algae processing duct 2 flows in the flow regulating duct 5 and is discharged into water on the outside.

The flow regulating duct 5 prevents the water injected from the water flow generator 4 from being scattered immediately after injection, and directs the water straight to a far distance. By scattering the water at a far position, it performs a function of agitating the enclosed water in a short time. Although the flow regulating duct 5 is placed at the water bottom so that both ends thereof are open substantially horizontally, it may be placed at an arbitrarily inclined angle as necessary.

The flow regulating duct 5 is formed as a cylinder, and both ends thereof are open. One open end consists of a water inflow port 5a, and the other end consists of a water discharge port 5b. At the lower part of the flow regulating duct 5, support members 5c for positioning the flow regulating duct 5 horizontally on the bottom of a body of water and supporting it are installed on the front side and rear side in the duct axis direction.

The drive water chamber 4e of the water flow generator 4 is connected to one end of a drive water supply pipe 6. The other end of the drive water supply pipe 6 is connected to a drive water pump 7. The drive water pump 7 supplies the water as injection water to the water flow generator 4 through the drive water supply pipe 6.

On the flow path inside wall surface of the inside portion 4a on the upstream side of the injection port 4d, a plurality of ozone injection holes 8 for injecting ozone are formed at equal intervals in the inner peripheral direction. Each ozone injection hole 8 is formed obliquely toward the water flow generator discharge port 4b at the upstream end of the inside portion 4a. Each ozone injection hole 8 has a mechanism such that ozone is sucked and discharged-by the water injected at a high velocity through the injection port 4d on the downstream side.

In the section of the water flow generator 4 on the outside of the inside portion 4a, an annular ozone supply chamber 8a communicating with the ozone injection holes 8 is formed. The ozone supply chamber 8a is located on the upstream side of the drive water chamber 4e. The ozone supply chamber 8a is a supply portion for ozone injected through the ozone injection holes. Each ozone injection hole 8 is formed on the downstream side of the ozone supply chamber 8a so as to communicate with the ozone supply chamber 8a.

The ozone supply chamber 8a is connected with one end of an ozone supply pipe 9. The other end of the ozone supply pipe 9 is connected to an ozone generator 10 provided on the later-described floating body 12 on the water surface. The ozone generator 10 supplies the generated ozone to the water flow generator 4 through the ozone supply pipe 9.

The ozone generator 10 is adapted such that oxygen in air is changed to ozone by irradiating, for example, ultraviolet rays of a particular wavelength region. In the hollow vessel, for example, a far ultraviolet ozone ray discharge tube is provided to irradiate ultraviolet rays. An air compressor 11 for supplying air to the ozone generator 10 is provided so as to be connected to the outside of the ozone generator 10.

The floating body 12 is a structure floating on the water surface. The floating body 12 is provided with the ultrasonic wave generator 3a, which is an electrical energy supply source for the ultrasonic wave transmitter 3, the drive water pump 7 for supplying injection water to the water flow generator 4, the ozone generator 10, the air compressor 11, and other equipment. The ultrasonic wave transmitter 3, the water flow generator 4, ozone generator 10, and the like can be used at an arbitrary position in the water.

Also, when the blue green algae processing duct 2 is held under water in the vicinity of the water surface, the blue green algae processing duct 2 is supported by the hanging members 12a in the water under the floating body 12, and is held in the vicinity of the water surface. It is to be noted that the ultrasonic wave generator 3a, the drive water pump 7, the ozone generator 10, the air compressor 11, and other equipment maybe installed on land as in the case of the prior art. Also, the drive water pump 7 may be installed under water if necessary by using a submerged pump.

The following is a description of the operation of the above embodiment.

In order to operate the ultrasonic wave transmitter 3 and the water flow generator 4, constituting the regional water purifier 1, the ultrasonic wave generator 3a installed on the floating body 12 or on land and the drive water pump 7 installed on the floating body 12 or on land, or under water if necessary, are driven. Also, when the ozone generator 10 is operated, the air compressor 11 installed on the floating body 12 or on land is driven.

If the ultrasonic wave generator 3a installed on the floating body 12 or on land is driven, the ultrasonic wave transmitter 3 provided in the blue green algae processing duct 2 vibrates, and transmits ultrasonic waves toward the inside of the blue green algae processing duct 2.

Also, if the drive water pump 7 installed on; the floating body 12 or on land, or under water if necessary, is driven, the drive water pump 7 takes in the water, sends the water under pressure to the drive water supply pipe 6, and supplies it to the water flow generator 4 in the flow regulating duct 5 installed on the bottom of the water.

Further, if the air compressor 11 installed on the floating body 12 or on land is driven, the air compressor 11 sucks and compresses the air in the atmosphere and sends it into the ozone generator 10. The ozone generator 10 is provided with, for example, the far ultraviolet ozone ray discharge tube, so that part of the oxygen in the sent air is changed to ozone by the irradiation of far ultraviolet ozone rays. The ozone is allowed to flow down in the ozone supply pipe 9 to be supplied to the water flow generator 4 in the rectifier duct 5 placed on the bottom of the water.

The water supplied to the water flow generator 4 through the drive water supply pipe 6 by the drive water pump 7 enters the annular drive water chamber 4e formed in the water flow generator 4, and is injected from the drive water chamber 4e into the inside portion 4a through the injection port 4d on the outlet side. The water injected into the inside portion 4a through the injection port 4d is injected at a high velocity toward the water flow generator discharge port 4b. The water injected at a high velocity pushes out the water on, the downstream side of the injection port 4d at a high velocity toward the water flow generator discharge port 4b.

At this time, on the upstream side of the injection port 4d of the inside portion 4a, a negative pressure region is produced by the water injected toward the water flow generator discharge port 4b. The production of the negative pressure region generates a suction force. By this suction force, the water in the blue green algae processing duct 2 is allowed to flow into the inside portion 4a from the water flow generator inflow port 4c of the inside portion 4a.

The water is sucked and flows to a location where the injection port 4d of the inside portion 4a is formed, and then is pushed out toward the water flow generator discharge port 4b at a high velocity by the water injected-toward the downstream side of the injection port 4d.

On the other hand, the water in the blue green algae processing duct 2 is sucked from the second end 2b by the water flow generator 4 and discharged. Therefore, a negative pressure region is produced at the first end 2a of the blue green algae processing duct 2 ,and at the first end 2a of the blue green algae processing duct 2, a suction flow for sucking the water in the duct 2 is generated. Therefore, the water containing blue green algae flows into the blue green algae processing duct 2 from the first end 2a, flows through the duct 2, and moves toward the second end 2b.

The ultrasonic wave transmitter 3, which is provided in the blue green algae processing duct 2, transmits ultrasonic waves toward the inside of the duct 2. The ultrasonic waves transmitted in the blue green algae processing duct 2 act on the water containing blue green algae directly or while being reflected by the ultrasonic wave reflector 2c when the ultrasonic wave reflector 2c is mounted on the inner peripheral surface of the blue green algae processing duct 2.

If the ultrasonic waves act on the water containing blue green algae, which moves in the blue green algae processing duct 2, the gas vacuoles performing a function of buoyancy in the blue green algae floating in the water are destroyed by the impact of the ultrasonic waves. Therefore, the blue green algae cannot float again, and thereby they are changed into an inactive state, which is a state similar to a perishing state, whereby the blue green algae can be processed.

Thus, the blue green algae breeding in large quantities in the enclosed body of water are sucked from a first end 2a of the blue green algae processing duct 2 together with the water containing the blue green algae, and during the transfer in the duct 2, they are processed by the action of ultrasonic waves transmitted from the ultrasonic wave transmitter 3 provided in the blue green algae processing duct 2. Thereafter, the blue green algae are discharged from the second end 2b of the blue green algae processing duct 2.

In the case where the flow regulating duct 5 incorporating the water flow generator 4 is installed at the second end 2b of the blue green algae processing duct 2, when the inside diameter of the second end 2b of the blue green algae processing duct 2 is larger than the outside diameter of the flow regulating duct 5, and an annular opening is formed at the outer periphery of the flow regulating duct 5, part of the water containing the processed blue green algae is discharged into the water outside of the second end 2b of the blue green algae processing duct 2. The remaining water containing the processed blue green algae flows in the rectifier duct 5 and the water flow generator 4 and is then discharged into the water outside.

When the diameter of the flow regulating duct 5 is equal to the diameter of the second end 2b of the blue green algae processing duct 2, and one end of the flow regulating duct 5 is connected to the second end of the blue green algae processing duct 2, the water flowing in the blue green algae processing duct 2 enters the flow regulating duct 5, flowing through the flow regulating duct 5 and the water flow generator 4, and is discharged into the water outside. Also, when the water flow generator 4 is installed in the blue green algae processing duct 2, the water is discharged into the water outside through the second end 2b of the blue green algae processing duct 2.

The ozone supplied to the water flow generator 4 through the ozone supply pipe 9 enters the annular ozone supply chamber 8a formed in the water flow generator 4, and is sucked and injected into the inside portion 4a from the ozone supply chamber 8a through the ozone injection holes 8 on the outlet side.

At the location of the inside portion 4a where the ozone injection holes 8 are formed, a negative pressure region is produced by the water injected through the injection port 4d. By the suction force due to the negative pressure, the ozone is sucked and injected from the ozone injection holes 8. The ozone sucked and injected in the inside portion 4a from the ozone injection holes 8 is mixed with water flowing in the inside portion 4a at a high velocity toward the water flow generator discharge port 4b. As a result, the ozone has a very fine minute bubble shape, and an ozone gas aerating water which is less liable to float is produced. The ozone gas aerating water becomes a discharge flow injected at a high-velocity from the water flow generator discharge port 4b of the water flow generator 4.

Ozone is mixed with the discharge flow injected at a high velocity from the water flow generator discharge port 4b. This ozone mixing water flows in the rectifier duct 5 provided with the water flow generator 4 therein, and is discharged at a high velocity on the bottom layer side of the enclosed body of water outside of the ducts.

The processed blue green algae are mixed with the ozone gas aerating water discharged at a high velocity, so that the processed blue green algae, which are an organic substance, are decomposed by oxidation by the oxidizing action of ozone. Therefore, the cause for the blue green algae to be accumulated on the water bottom as an organic substance and for sludge to be formed and accumulated can be eliminated.

Also, the blue green algae/ozone mixing water injected at a high velocity from the water flow generator discharge port 4b is prevented from scattering to the surroundings immediately after the injection from the water flow generator 4 by passing through the duct inside of the flow regulating duct 5. Further, since the minute bubbles less liable to float are injected substantially straight in the discharge direction, the force of the injected blue green algae/ozone mixing water is prevented from decreasing, so that the mixing water can be injected to a far distance in a straight manner. Therefore, the blue green algae/ozone mixing water can be sent out to a far distance on the bottom layer side of the enclosed body of water. Therefore, the blue green algae water mass can be circulated in the regional waters, thereby enhancing the algae processing performance.

Embodiment 2

Next, Embodiment 2 of the present invention shown in FIGS. 14 and 15 will be described.

A regional water purifier 21 is an apparatus for purifying a water channel 22 of an enclosed body of water through the blue green algae processing. This apparatus consists mainly of an ultrasonic wave transmitter, which transmits ultrasonic waves in the water channel 22 of the regional waters where blue green algae breed in large quantities to process the blue green algae with the ultrasonic waves so as to make them inactive, an ultrasonic wave reflector 23 disposed opposite to the ultrasonic wave transmitter 3, and a water flow generator 4, which produces a discharge flow for discharging water containing blue green algae toward the regional waters where the ultrasonic wave transmitter 3 and the ultrasonic wave reflector 23 are disposed. The water flow generator 4 is generally used in a state of being incorporated in a flow regulating duct 5.

The configurations of the ultrasonic wave transmitter 3, water flow generator 4, flow regulating duct 5, drive water supply pipe 6, and drive water pump 7 are the same as those in the aforementioned Embodiment 1, and therefore the explanation there of omitted. Although not shown in FIG. 15, the water flow generator 4 that is constructed so that ozone is mixed is sometimes used as necessary. In this case, an ozone injection hole 8, ozone supply chamber 8a, ozone supply pipe 9, ozone generator 10, air compressor 11, and other equipment having the same construction as that of Embodiment 1 are provided.

The configurations of the ultrasonic wave transmitter 3, water flow generator 4, rectifier duct 5, drive water supply pipe 6, and drive water pump 7 are the same as those in the aforementioned Embodiment 1, and therefore the explanation thereof is omitted. Although not shown in FIG. 15, the water flow generator 4 that is constructed so that ozone is mixed is sometimes used as necessary. In this case, an ozone injection hole 8, ozone supply chamber 8a, ozone supply pipe 9, ozone generator 10, air compressor 11, and other equipment having the same construction as that of Embodiment 1 are provided.

Figure 14:
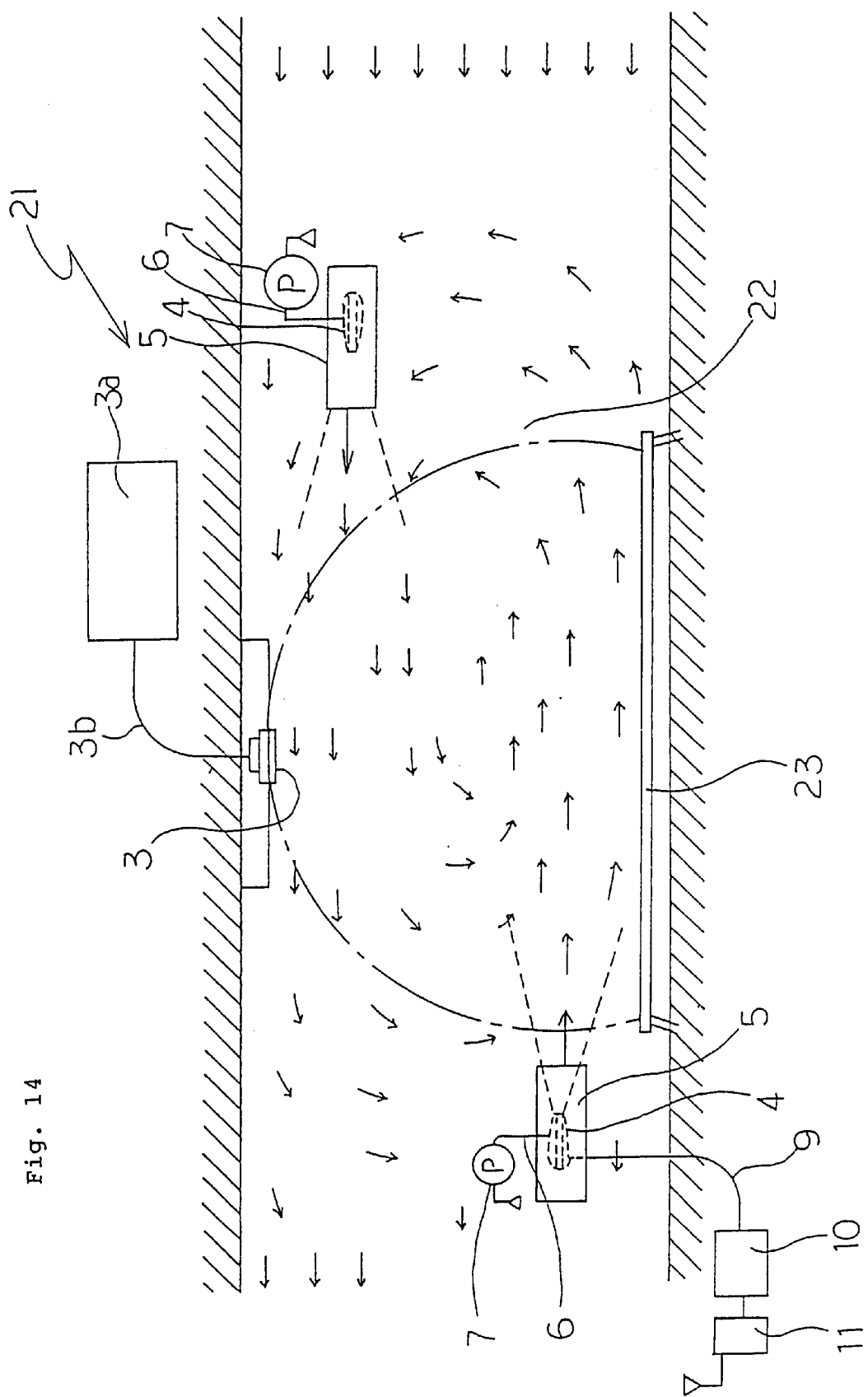
FIG. 14 is a plan view showing Embodiment 2 of the present invention.

In the case where the water channel 22 of the regional waters where blue green algae breed in large quantities is not so wide, as shown in FIG. 14, the ultrasonic wave transmitter 3 is installed under water on one side surface of the water channel 22, and the ultrasonic wave reflector 23 is installed opposite to the ultrasonic wave transmitter 3 under water on the other side surface opposite to the one side surface of the water channel 22 where the ultrasonic wave transmitter 3 is installed.

Figure 15:
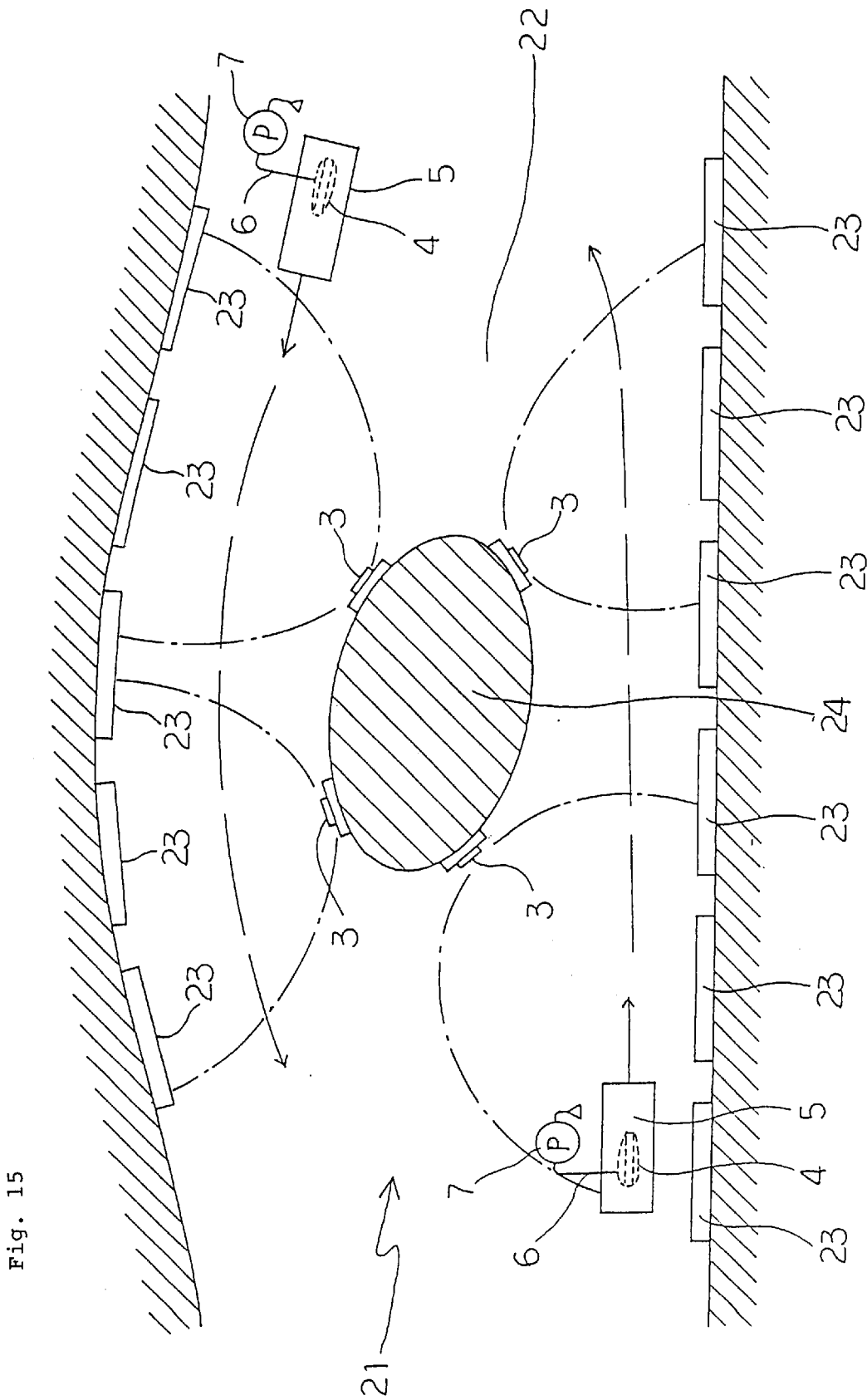
FIG. 15 is a plan view showing Embodiment 2 of the present invention.

In the case where the water channel 22 of the regional waters where blue green algae breed in large quantities is wide, as shown in FIG. 15, a structure 24 such as an artificial island or a floating body is disposed in the central portion of the water channel 22. A plurality of ultrasonic wave transmitters 3 are installed under water on the outer peripheral surface of the structure 24, and a plurality of ultrasonic wave reflectors 23 are installed opposite to the ultrasonic wave transmitters 3 under water on both side surfaces of the water channel 22 opposite to the plural ultrasonic wave transmitters 3 installed on the outer peripheral surface of the structure 24.

The ultrasonic wave reflectors 23 are installed so as to extend to both sides with the ultrasonic wave transmitter 3 being the center, and also installed at positions where the ultrasonic waves transmitted from the ultrasonic wave transmitter 3 can be reflected efficiently. For example, a metal plate that reflects ultrasonic waves is used as the ultrasonic wave reflector 23. The surface of the ultrasonic wave reflector 23 may be formed into a flat surface, or may be formed into an irregularly reflecting surface.

The ultrasonic wave transmitter 3 is connected to an ultrasonic wave generator 3a, an electrical energy supply source, installed on the shore side of the water channel 22 via a wire 3b. Ultrasonic waves are transmitted by being vibrated by the electrical energy amplified by the ultrasonic wave generator 3a, whereby the blue green algae are processed.

On the upstream and downstream sides of the water channel 22 with respect to the ultrasonic wave transmitter 3 and the ultrasonic wave reflector 23 installed opposite to each other, the water flow generator 4 incorporated in the flow regulating duct 5 is disposed under the water surface to allow water containing blue green algae to flow in the regional waters where the ultrasonic wave transmitter 3 and the ultrasonic wave reflector 23 are installed opposite to each other.

The water flow generator 4 on the upstream side of the water channel 22 is disposed so as to produce the water flow toward the downstream side, while the water flow generator 4 on the downstream side of the water channel 22 is disposed so as to produce the water flow toward the upstream side. Each water flow generator 4 disposed on the upstream and downstream sides, respectively, is disposed near the side surface on the opposite side of the water channel 22, so that a circulating flow is easily produced between the upstream side and the downstream side of the water channel 22 where the water flow generator 4 is disposed.

The following is a description of the operation of this embodiment.

In order to operate the ultrasonic wave transmitter 3 and the water flow generator 4, constituting the regional water purifier 22, the ultrasonic wave generator 3a and the drive water pump 7 are driven. Also, when the ozone generator 10 is operated, the air compressor 11 is driven.

In the case where the water channel 22 is not so wide, if the ultrasonic wave generator 3a is driven, the ultrasonic wave transmitter 3 installed under water on one side surface of the water channel 22 vibrates, and transmits ultrasonic waves toward the ultrasonic wave reflector 23 installed under water on the other side surface of the water channel 22. In the case where the water channel 22 is wide, if the ultrasonic wave generator 3a is driven, the ultrasonic wave transmitters 3 installed under water on the outer peripheral surface of the structure 24 disposed at the central portion of the water channel 22 vibrate, and transmit ultrasonic waves toward the ultrasonic wave reflectors 23 installed opposite to the ultrasonic wave transmitters 3 under water on both sides of the water channel 22.

Also, if the drive water pump 7 is driven, the drive water pump 7 takes in the water in the enclosed body of water, sends the water under pressure to the drive water supply pipe 6, and supplies it to the water flow generator 4 in the flow regulating duct 5 installed under water.

Further, if the air compressor 11 is driven, the air compressor 11 sucks and compresses the air in the atmosphere and sends it into the ozone generator 10. The ozone generator 10 is provided with, for example, a far ultraviolet ozone ray discharge tube, so that part of oxygen in the sent air is changed to ozone by the irradiation of far ultraviolet ozone rays. The ozone is allowed to flow down in the ozone supply pipe 9 to be supplied to the water flow generator 4 in the flow regulating duct 5 disposed under water.

The water supplied to the water flow generator 4 through the drive water supply pipe 6 by the drive of the drive water pump 7 enters the annular drive water chamber 4e formed in the water flow generator 4, and is injected from the drive water chamber 4e into the inside portion 4a through the injection port 4d on the outlet side. The injected water injected into the inside portion 4a through the injection port 4d is injected at a high velocity toward the water flow generator discharge port 4b. The water injected at a high velocity pushes out the water on the downstream side of the injection port 4d at a high velocity toward the water flow generator discharge port 4b.

Thus, by the operation of the water flow generators 4 disposed in the water channel 22 on the upstream and downstream sides of the water channel 22 where the ultrasonic wave transmitter 3 and the ultrasonic wave reflector 23 are installed, the water containing blue green algae is allowed to flow into the regional waters where the ultrasonic wave transmitter 3 and the ultrasonic wave reflector 23 are installed.

The ultrasonic waves which are transmitted from the ultrasonic wave transmitter 3 and reflected by the ultrasonic wave reflector 23 act on the water containing blue green algae flowing into the regional waters where the ultrasonic wave transmitter 3 and the ultrasonic wave reflector 23 are installed.

If the ultrasonic waves act on the water containing blue green algae in the water channel 22, the gas vacuoles performing a function of buoyancy in the blue green algae floating in the water are destroyed by the impact of the ultrasonic waves. Therefore, the blue green algae settle and cannot float again, and thereby they become inactive similar to a perishing state, whereby the blue green algae can be processed.

Thus, the blue green algae breeding in large quantities in the water channel 22 of the enclosed body of water are allowed to flow, together with the water containing blue green algae, in the regional waters where the ultrasonic wave transmitter 3 and the ultrasonic wave reflector 23 are installed by the water flow generator 4. During the transfer in the regional waters, the blue green algae are processed by the action of ultrasonic waves transmitted from the ultrasonic wave transmitter 3 and flows out to the outside of the regional body of water.

The ozone supplied to the water flow generator 4 through the ozone supply pipe 9 enters the annular ozone supply chamber 8a formed in the water flow generator 4, and is sucked and injected into the inside portion 4a from the ozone supply chamber 8a through the ozone injection holes 8 on the outlet side.

At the location of the inside portion 4a where the ozone injection holes 8 are formed, a negative pressure region is produced by the water injected through the injection port 4d. By the suction force due to the negative pressure, the ozone is sucked and injected from the ozone injection holes 8. The ozone sucked andinjectedinthe inside portion 4a from the ozone injection holes 8 is mixed with water flowing in the inside portion 4a at a high velocity toward the water flow generator discharge-port 4b. As a result, the ozone develops a very fine minute bubble shape, and an ozone gas aerating water less liable to float is produced. This ozone gas aerating water forms a discharge flow injected at a high velocity from the water flow generator discharge port 4b of the water flow generator 4.

Ozone is mixed with the discharge flow injected at a high velocity from the water flow generator discharge port 4b. This ozone mixing water flows in the flow regulating duct 5 provided with the water flow generator 4 therein, and is discharged-at a high velocity on the bottom layer side of the enclosed body of water of the outside.

On the bottom layer side of the regional waters to which the ozone mixing water is discharged at a high velocity, the processed blue green algae settle, so that the processed blue green algae, which are an organic substance, are decomposed by oxidation by the oxidizing action of ozone. Therefore, the blue green algae is prevented from being accumulated into sludge on the bottom of the water.

The present invention is not limited to the above embodiments, and, needless to say, can be modified variously without departing from the spirit of the present invention. For example, although the case where ozone is mixed has been explained in the aforementioned Embodiments 1 and 2, the mixing of ozone may be omitted as necessary.

As is apparent from the above description, according to the regional water purifier in accordance with the present invention, the water containing blue green algae is sucked and allowed to flow into the blue green algae processing duct from one end of the blue green algae processing duct. Ultrasonic waves are irradiated on the blue green algae by the ultrasonic wave transmitter provided in the blue green algae processing duct to impact the blue green algae, and the gas vacuoles performing a function of buoyancy in the cells of blue green algae are destroyed by the impact of the ultrasonic waves. Therefore, the blue green algae settle and cannot float again. As a result, they enter an inactive state, which is similar to a perishing state, whereby the so-called blue green algae can be processed. Moreover, since the blue green algae is processed by sucking and allowing the water containing blue green algae to flow into the blue green algae processing duct, the blue green algae can be processed efficiently in a wide regional waters where blue green algae breed in large quantities.

If an ultrasonic wave reflector is mounted on the inner peripheral surface of the blue green algae processing duct 2, the ultrasonic waves irradiated from the ultrasonic wave transmitter are reflected by the ultrasonic reflector. Thereby, when the blue green algae are processed by irradiating ultrasonic waves in the blue green algae processing duct, the blue green algae are processed by the reflected ultrasonic waves. The ultrasonic wave irradiating frequency of blue green algae in the blue green algae processing duct is enhanced, so that the blue green algae processing capacity can be enhanced.

If the ultrasonic wave transmitter 3 is disposed in a ring shape at the inside center of the blue green algae processing duct, as shown in FIG-10, so that the ultrasonic waves are transmitted radially from the inside center toward the inner peripheral surface, ultrasonic waves can be irradiated uniformly from the inside center of the blue green algae processing duct to the peripheral portion thereof Therefore, the blue green algae in the blue green algae processing duct can be processed uniformly.

If the ultrasonic wave transmitter is disposed obliquely on the inner peripheral surface at the other end of the blue green algae processing duct toward one end thereof, the ultrasonic waves can be irradiated toward one end while repeating reflections on the inner peripheral surface of the blue green algae processing duct. Thus, the period of time for the ultrasonic waves to stay in the blue green algae processing duct can be increased. Therefore, the period of time for the blue green algae to be processed by the ultrasonic waves can be prolonged, so that the blue green algae processing efficiency can be enhanced.

If the ultrasonic wave transmitter is disposed at the second end of the blue green algae processing duct toward one end thereof, the ultrasonic waves can be irradiated uniformly on the water containing blue green algae. The water is sucked from the first end of the blue green algae processing duct and flows in the blue green algae processing duct toward the second end, so that the blue green algae processing efficiency can be enhanced.

If the water flot generator is disposed at the second end of the blue green algae processing duct, the water flow generator discharges the water in the blue green algae processing duct from the second end thereof, so that the interior of the blue green algae processing duct is in a negative pressure state. Therefore, a suction flow is produced at the first end opposite to the second end, so that the water containing blue green algae can be allowed to flow in the blue green algae processing duct.

If the water flow generators are disposed in plural numbers at appropriate intervals in the duct axis direction at the inside center of the blue green algae processing duct, and the ultrasonic wave transmitters are disposed in plural numbers at appropriate intervals in the duct axis direction of the blue green algae processing duct, when the blue green algae processing duct is long, the water containing blue green algae can be sucked therein from one end and discharged from the other end. Moreover, by the ultrasonic waves irradiated from the plural ultrasonic wave transmitters, the blue green algae flowing in the long blue green algae processing duct from the first end to the second end can be processed surely.

If the blue green. algae processing duct is curved so that the first end of the suction inflow side is placed horizontally in the vicinity of the water surface, and the second end of the discharge side is placed horizontally at a position deeper than the first end, the blue green algae floating near the water surface can be processed in the blue green algae processing duct by being sucked and allowed to flow therein.

If the blue green algae processing duct is curved so that the first end of the suction inflow side is placed horizontally in the vicinity of the water surface, and the second end of the discharge side is placed horizontally on the water bottom side, the blue green algae floating near the water surface can be processed in the blue green algae processing duct by being sucked and allowed to flow therein, and the processed blue green algae are discharged to the bottom layer of regional waters. Therefore, the stagnancy and sedimentary tendency in the bottom water layer can be prevented, and a water flow promoting effect. can be enhanced.

If the first end of the suction inflow side of the blue green algae processing duct is expanded in a trumpet shape, at a portion where the cross-sectional area of flow path is large, the flow velocity is low, and sufficient ultrasonic wave irradiating time is maintained. On the other hand, at a portion where the cross-sectional area is small, the flow velocity is increased, so that the water containing the processed blue green algae can be discharged efficiently.

Water containing blue green algae in a water channel is allowed to flow into the water channel of regional waters where the ultrasonic wave transmitter and the ultrasonic wave reflector are installed opposite to each other. Ultrasonic waves are irradiated and reflected on the blue green algae by the ultrasonic wave transmitter and ultrasonic wave reflector to impact to the blue green algae. As a result, the gas vacuoles performing a function of buoyancy in the cells of blue green algae are destroyed by the impact of the ultrasonic waves. Therefore, the blue green algae settle and cannot float again, and thereby they enter an inactive state, which is a state similar to a perishing state, whereby the so-called blue green algae can be processed. Moreover, since the blue green algae are processed by allowing the water containing blue green algae to flow into the water channel of regional waters where the ultrasonic wave transmitter and the ultrasonic wave reflector are installed opposite to each other, the blue green algae can be processed efficiently in wide regional waters where blue green algae breed in large quantities.

If the ultrasonic wave transmitter is disposed on one side surface of the water channel, and the ultrasonic wave reflector is disposed on the other side surface of the water channel, by the reflection of ultrasonic waves by the ultrasonic wave reflector, the ultrasonic waves can be applied to the blue green algae on the water surface or in the water from both sides of the water channel. Therefore, the blue green algae in the wide water channel of regional waters can be processed efficiently from both sides.

If the ultrasonic wave transmitters are disposed in plural numbers toward both side surfaces of the water channel at the center of the water channel of regional waters where blue green algae breed in large quantities, and the ultrasonic wave reflectors are disposed in plural numbers on both side surfaces of the water channel of regional waters where blue green algae breed in large quantities, the ultrasonic waves can be applied to the blue green algae on the water surface or-in the water from the central portion and both sides of the water channel. Therefore, the blue green algae in the wide water channel can be processed efficiently from both sides.

If the ultrasonic wave reflector is formed as an irregular reflector, the ultrasonic waves are reflected in all directions in the blue green algae processing duct or in the water channel. Therefore, the blue green algae lying at any location in the blue green algae processing duct or in the water channel can be processed.

If the water flow generator is incorporated in a rectifier duct consisting of a duct having both ends open to enhance the water flow generating capability of the water flow generator, the water flow produced by the water flow generator flows in the rectifier duct and is not scattered. Therefore, a strong water force is created, so that strong suction flow and discharge flow can be produced.

If ozone is mixed with the discharge flow, since the discharge flow contains large quantities of processed blue green algae, the processed and discharged blue green algae are decomposed by the oxidation due to ozone, and at the same time the water flow is promoted by the water flow generator. Therefore, the sludge formation caused by the sedimentation of the processed blue green algae on the bottom of the water can be prevented.

If the water flow generator is provided with an ozone gas aerating part, ozone can be mixed with the discharge flow by the water flow generator which produces the discharge flow.

What is claimed is:

1. A water purifier for purifying a body of water, comprising:
    a submersible processing duct operable to be fully submersed in the body of water to be purified and having a first open end and a second open end opposite said first open end;
    a submersible ultrasonic wave transmitter arranged in said processing duct for transmitting ultrasonic waves through water flowing through said processing duct;
    a flow regulating duct having a cross sectional area smaller than a cross sectional area of said processing duct and being arranged at said second open end of said processing duct; and
    a submersible water flow generator arranged in said flow regulating duct for creating a flow of water through said processing duct by creating a suction at said first open end to suck the water into said processing duct and by creating a discharge pressure at said second open end for discharging the water from said second open end.

2. The water purifier of claim 1, further comprising an ultrasonic wave reflector mounted on an inner peripheral surface of said processing duct.

3. The water purifier of claim 2, wherein said ultrasonic wave reflector comprises a reflector having a non-planar reflecting surface.

4. The water purifier of claim 3, wherein said ultrasonic wave reflector comprises a reflector having a wavy reflecting surface.

5. The water purifier of claim 3, wherein said ultrasonic wave reflector comprises a reflector having a reflecting surface including a series of triangular ridges.

6. The water purifier of claim 1, wherein said ultrasonic wave transmitter comprises a ring-shaped transmitter arranged along a central axis of said processing duct such that ultrasonic waves are transmitted radially from said ring-shaped transmitter toward an inner peripheral surface of said processing duct.

7. The water purifier of claim 1, wherein said ultrasonic wave transmitter is located on an inner peripheral surface of said processing duct at said second open end and is arranged so as to face toward said first open end at an oblique angle.

8. The water purifier of claim 1, wherein said ultrasonic wave transmitter is located at said second open end and is arranged so as to face toward said first open end.

9. The water purifier of claim 1, further comprising a plurality of ultrasonic wave transmitters spaced apart in a longitudinal direction of said processing duct.

10. The water purifier of claim 1, wherein said processing duct is curved such that a central axis of said first open end is horizontal, and such that a central axis of said second open end is horizontal at a position below said central axis of said first open end.

11. The water purifier of claim 10, wherein said processing duct has a cross-sectional area gradually increasing towards said first open end.

12. The water purifier of claim 1, wherein said processing duct has a cross-sectional area gradually increasing towards said first open end.

13. The water purifier of claim 1, further comprising a mechanism for mixing ozone with the water to be discharged from said second open end of said processing duct.

14. The water purifier of claim 1, wherein said water flow generator includes an ozone gas aerating mechanism.

15. The water purifier of claim 1, wherein said water flow generator includes a water chamber communicating with an injection port, said injection port being arranged at an oblique angle for injecting water into an interior of said water flow generator toward a discharge port of said water flow generator, and including an annular ozone chamber communicating with ozone injection holes located in said water flow generator upstream of said injection port for supplying ozone into water flowing through said water flow generator.

16. A water purifier for purifying a body of water, comprising:
    a submersible processing duct operable to be fully submersed in the body of water to be purified and having a first open end and a second open end opposite said first open end, a cross-sectional area of said processing duct gradually increasing from said second open end towards said first open end;
    a submersible ultrasonic wave transmitter arranged in said processing duct for transmitting ultrasonic waves through water flowing through said processing duct; and
    a submersible water flow generator arranged at said second open end of said processing duct for creating a flow of water through said processing duct by creating a suction at said first open end to suck the water into said processing duct and by creating a discharge pressure at said second open end for discharging the water from said second open end.

17. The water purifier of claim 16, further comprising a flow regulating duct having a first open end and a second open end, wherein a cross sectional area of said first open end of said flow regulating duct is equal to a cross sectional area of said second open end of said processing duct, and wherein said first open end of said flow regulating duct adjoins said second open end of said processing duct.

18. The water purifier of claim 17, wherein said water flow generator is arranged within said flow regulating duct.

19. The water purifier of claim 16, further comprising an ultrasonic wave reflector mounted on an inner peripheral surface of said processing duct.

20. The water purifier of claim 19, wherein said ultrasonic wave reflector comprises a reflector having a non-planar reflecting surface.

21. The water purifier of claim 20, wherein said ultrasonic wave reflector comprises a reflector having a wavy reflecting surface.

22. The water purifier of claim 20, wherein said ultrasonic wave reflector comprises a reflector having a reflecting surface including a series of triangular ridges.

23. The water purifier of claim 16, wherein said ultrasonic wave transmitter comprises a ring-shaped transmitter arranged along a central axis of said processing duct such that ultrasonic waves are transmitted radially from said ring-shaped transmitter toward an inner peripheral surface of said processing duct.

24. The water purifier of claim 16, wherein said ultrasonic wave transmitter is located on an inner peripheral surface of said processing duct at said second open end and is arranged so as to face toward said first open end at an oblique angle.

25. The water purifier of claim 16, wherein said ultrasonic wave transmitter is located at said second open end and is arranged so as to face toward said first open end.

26. The water purifier of claim 16, wherein said processing duct is curved such that a central axis of said first open end is horizontal, and such that a central axis of said second open end is horizontal at a position below said central axis of said first open end.

27. The water purifier of claim 16, wherein said water flow generator includes an ozone gas aerating mechanism.

28. The water purifier of claim 16, wherein said water flow generator includes a water chamber communicating with an injection port, said injection port being arranged at an oblique angle for injecting water into an interior of said water flow generator toward a discharge port of said water flow generator, and including an annular ozone chamber communicating with ozone injection holes located in said water flow generator upstream of said injection port for supplying ozone into water flowing through said water flow generator.

* * * * *